(12) United States Patent
Ellison et al.

(10) Patent No.: US 11,347,831 B2
(45) Date of Patent: May 31, 2022

(54) SYSTEM AND METHOD FOR USER RECOGNITION BASED ON COGNITIVE INTERACTIONS

(71) Applicant: Conflu3nce Ltd., Jerusalem (IL)

(72) Inventors: Tami Ellison, Jerusalem (IL); Shelija Guberman, Cupertino, CA (US)

(*) Notice: Subject to any disclaimer, the term of this patent is extended or adjusted under 35 U.S.C. 154(b) by 190 days.

(21) Appl. No.: 16/708,463

(22) Filed: Dec. 10, 2019

(65) Prior Publication Data

US 2020/0184052 A1     Jun. 11, 2020

Related U.S. Application Data

(60) Provisional application No. 62/777,283, filed on Dec. 10, 2018.

(51) Int. Cl.
*G06F 21/36* (2013.01)
*G06F 21/31* (2013.01)
*G06F 21/40* (2013.01)

(52) U.S. Cl.
CPC ............ *G06F 21/316* (2013.01); *G06F 21/36* (2013.01); *G06F 21/40* (2013.01); *G06F 2221/2133* (2013.01)

(58) Field of Classification Search
CPC ......... G06F 21/316; G06F 21/36; G06F 21/40
USPC .......................................................... 726/7
See application file for complete search history.

(56) References Cited

U.S. PATENT DOCUMENTS

| | | |
|---|---|---|
| 5,313,527 A | 5/1994 | Guberman et al. |
| 7,891,005 B1 * | 2/2011 | Baluja ................ G06F 21/36 726/26 |
| 8,298,060 B2 | 10/2012 | Weichselbaum |
| 8,495,518 B2 | 7/2013 | Boden et al. |
| 8,607,331 B2 | 12/2013 | Sun et al. |
| 8,898,733 B2 | 11/2014 | Garside |
| 9,317,676 B2 | 4/2016 | Liu et al. |
| 9,471,767 B2 | 10/2016 | Akula et al. |
| 9,563,763 B1 | 2/2017 | Roth et al. |
| 9,571,487 B2 | 2/2017 | Fitzgerald |
| 9,710,643 B2 | 7/2017 | Jakobsson et al. |

(Continued)

OTHER PUBLICATIONS

Al-Fannah, Nasser Mohammed. "Making defeating captchas harder for bots." 2017 Computing Conference. IEEE, 2017. New York, New York, USA (Conference held in London, England) <URL: https://arxiv.org/pdf/1704.02803.pdf>.

(Continued)

*Primary Examiner* — Jacob Lipman

(74) *Attorney, Agent, or Firm* — JMB Davis Ben-David

(57) ABSTRACT

Disclosed herein is a method for authenticating a user identity according to predetermined user interactions, including the use of at least one hardware processor for obtaining at least one image from a database, presenting said at least one image to a user through an authentication interface, requesting from the user at least one user interaction related to said at least one image, obtaining an input comprising at least one user interaction input, comparing said at least one user interaction input with said at least one user interaction to validate the user identity and to validate the user is a human, providing an indication regarding the user identity according to a result of comparing said at least one user interaction input with said at least one user interaction.

20 Claims, 21 Drawing Sheets

(56) References Cited

U.S. PATENT DOCUMENTS

| | | | |
|---|---|---|---|
| 10,582,189 | B2 | 3/2020 | Ellison |
| 2007/0101010 | A1 | 5/2007 | Ellison et al. |
| 2007/0201745 | A1* | 8/2007 | Wang ............... G06K 9/00 |
| | | | 382/181 |
| 2010/0162357 | A1 | 6/2010 | Chickering et al. |
| 2010/0169958 | A1* | 7/2010 | Werner ............. G06F 21/36 |
| | | | 726/6 |
| 2011/0072498 | A1* | 3/2011 | Li ..................... G06F 21/36 |
| | | | 726/6 |
| 2018/0013758 | A1 | 1/2018 | Yu |
| 2019/0347801 | A1 | 11/2019 | Ellison |
| 2020/0253527 | A1 | 8/2020 | Ellison |

OTHER PUBLICATIONS

Mancuso, Vincent F., et al. "Human factors of cyber attacks: a framework for human-centered research." Proceedings of the Human Factors and Ergonomics Society Annual Meeting. vol. 58. No. 1. Sage CA: Los Angeles, CA: SAGE Publications, 2014.<URL: https://d1wqtxts1xzle7.cloudfront.net/50068433/437.full.pdf?1478136328=&response-content-disposition=inline%3B+filename%3DHuman_Factors_of_Cyber_Attacks_A_Framewo.pdf&Expires=1604429261&Signature=AZYqfDi7S6ZvQOYNV0UCiCkiEp6eKaBcloikpcUF6zRQj~OejFKO-.

Alt, Florian, et al. "Graphical passwords in the wild: Understanding how users choose pictures and passwords in image-based authentication schemes" Proceedings of the 17th International Conference on Human-Computer Interaction with Mobile Devices and Services. 2015. Association for Computing Machinery, New York NY. USA <URL: http://www.florian-alt.org/unibw/wp-content/publications/alt2015mobilehci.pdf>.

Arias, Dan. "Adding Salt to Hashing: A Better Way to Store Passwords." (2019). URL: https://auth0.com/blog/adding-salt-to-hashing-a-better-way-to-store-passwords/<URL: https://auth0.com/blog/adding-salt-to-hashing-a-better-way-to-store-passwords/>.

Brase, Gary L., Eugene Y. Vasserman, and William Hsu. "Do different mental models influence cybersecurity behavior? Evaluations via statistical reasoning performance." Frontiers in psychology 8 (2017): 1929. Frontiers Media SA. Lausanne, Switzerland. <URL: file:///D:/Users/tami/Downloads/fpsyg-08-01929.pdf>.

Childers, Terry L., and Michael J. Houston. "Conditions for a picture-superiority effect on consumer memory." Journal of consumer research 11.2 (1984): 643-654. Chicago, Illinois, USA. <URL: https://www.researchgate.net/profile/Terry_Childers/publication/239278291_Conditions_for_a_Picture-Superiority_Effect_on_Consumer_Memory/links/00b7d529ce9df9422a000000.pdf>.

Chowdhury, Mohammad Jabed Morshed, and Narayan Ranjan Chakraborty. "Captcha based on human cognitive factor." arXiv preprint arXiv:1312.7444 (2013). arXiv Cornell University. Ithaca, New York, USA. <URL: https://arxiv.org/ftp/arxiv/papers/1312/1312.7444.pdf>.

Guberman, S. "Gestalt Theory of Cognition and "Solid" Sciences: Physics, Mathematics, and Artificial Intelligence." J Psychiatry and Cognitive Behaviour 3 (2018): 136. Gavin Publishers. Lisle, Illinois, USA. <URL: https://www.gavinpublishers.com/assets/articles_pdf/1550222958article_pdf87145872.pdf>.

Katsini, Christina, et al. "Influences of users' cognitive strategies on graphical password composition." Proceedings of the 2017 CHI Conference Extended Abstracts on Human Factors in Computing Systems. 2017. <URL: http://mbelk.info/files/conferences/CHI2017.pdf>.

Nayeem, Mir Tafseer, et al. "Design of a Human interaction Proof (HIP) using human cognition in contextual natural conversation." 2014 IEEE 13th International Conference on Cognitive Informatics and Cognitive Computing. IEEE, 2014. Institute of Electrical and Electronics Engineers. Piscataway, New Jersey, USA. <URL: https://d1wqtxts1xzle7.cloudfront.net/35179199/iccicc2014_submission_132.pdf?1413621401=&response-content-disposition=inline%3B+filename%3DDesign_of_a_Human_Interaction_Proof_HIP.

Parmar, Himika, Nancy Nainan, and Sumaiya Thaseen. "Generation of secure one-time password based on image Authentication." Journal of Computer Science and Information Technology 7 (2012): 195-206. American Research Institute for Policy Development. Madison, Wisconsin, USA. <URL: https://www.airccj.org/CSCP/vol2/csit2417.pdf>.

Paikin, Genady, and Ayellet Tal. "Solving multiple square jigsaw puzzles with missing pieces." Proceedings of the IEEE conference on computer vision and pattern recognition. 2015. <URL: https://www.cv-foundation.org/openaccess/content_cvpr_2015/papers/Paikin_Solving_Multiple_Square_2015_CVPR_paper.pdf>.

Rogaway, Phillip, and Thomas Shrimpton. "Cryptographic hash-function basics: Definitions, implications, and separations for preimage resistance, second-preimage resistance, and collision resistance." International workshop on fast software encryption. Springer, Berlin, Heidelberg, 2004 <URL: https://link.springer.com/content/pdf/10.1007/978-3-540-25937-4_24.pdf>.

Chowdhury, Mohammad Jabed Morshed, and Narayan Ranjan Chakraborty. "Captcha based on human cognitive factor." arXiv preprint arXiv:1312.7444 (2013). <URL: https://arxiv.org/ftp/arxiv/papers/1312/1312.7444.pdf>.

Hockley, William E. "The picture superiority effect in associative recognition." Memory & cognition 36.7 (2008): 1351-1359. <URL:https://link.springer.com/content/pdf/10.3758/MC.36.7.1351.pdf>.

Zhao, Ziming, et al. "On the security of picture gesture authentication." Presented as part of the 22nd {USENIX} Security Symposium ({USENIX} Security 13). 2013. The Advanced Computing Systems Association. Berkley, California, USA. <URL: https://www.usenix.org/system/files/conference/usenixsecurity13/sec1 3-paper_zhao.pdf>.

Zhu, Bin B., and Jeff Yan. "Towards New Security Primitives Based on Hard AI Problems." Cambridge International Workshop on Security Protocols. Springer, Berlin, Heidelberg, 2013.

Turing test. <URL: https://en.wikipedia.org/wiki/Turing_test>.

Multistable perception. <URL: https://en.wikipedia.org/wiki/Multistable_perception>.

Captcha: Telling Humans and Computers Apart Automatically. Carnegie Mellon University. <URL: http://www.captcha.net/>.

Goldberg, Jeffrey. "What does "MFA" mean?." (2018). <URL: http://com-agilebits-users.s3.amazonaws.com/goldberg/MFA/mfa.pdf>.

Public-key cryptography. <URL: https://en.wikipedia.org/wiki/Public-key_cryptography>.

Steganography. <URL: https://en.wikipedia.org/wiki/Steganography>.

Captcha. <URL: https://en.wikipedia.org/wiki/CAPTCHA>.

Fellows, Robert P., et al. "Multicomponent analysis of a digital Trail Making Test." The Clinical Neuropsychologist 31.1 (2017): 154-167. <URL: https://www.tandfonline.com/doi/full/10.1080/13854046.2016.1238510?casa_token=V8S4R78P8ZUAAAAA%3AMPPBJVo0LwcvwPS6cQOAjIA0rcRpvB4QaR23FaZbhzs_LBbsJi1qY0GPXhIshLMfLWw3_ZeqF2IH>.

* cited by examiner

740

745

746   747   748

750   755

760   765

SYSTEM AND METHOD FOR USER RECOGNITION BASED ON COGNITIVE INTERACTIONS

RELATED APPLICATIONS

The present application claims priority from U.S. provisional application Ser. No. 62/777,283, titled "System and Method for Recognizing User Identity Through User Interactions" filed on Dec. 10, 2018.

FIELD OF THE INVENTION

The present disclosure generally relates to the field of user identification and authentication.

BACKGROUND

There are many systems that require user access. Some have many users and require authorized users to log in. Some require user identification to access a particular portion or aspect of the system. Some contain personal information. There are many reasons to restrict access to these systems to only authorized users. Authorized users have to be identified before access can be granted.

For example, computer systems and subsystems are well known in the art. For security and privacy purposes, some computer systems include user identification protocols to limit access to authorized or validated users. For example, protocols are often put in place to limit access to the system, to a particular subsystem or other portion of the system, to particular databases, or to certain applications, documents and portions of documents, objects, and workstations. As used herein, the term "system" will be used to mean any of these entities. Such validation protocols are useful to the extent that they can provide reliable identification of an authorized user, and do not mis-identify an unauthorized user as an authorized user.

Authorized access for interactions including but not limited to point-to-point, point to device, and/or device to device interactions and/or combinations of these for multiple user access, where networks are required to communicate in a collaboration space and/or for data sharing, uploading or downloading operations, and/or for tracking information and data flow, the data owner/user can be part of the authorization process and alerted to access to their personal data by a third party which has been granted access by agreement for market and health data research and/or other medical purposes and/or other non-medical/health related purposes, and/or for other monitoring purposes requiring knowledge and tracking of the information or the user and/or any downstream processes which require authorization tracking for data distribution and to prevent abuse or data corruption or other unauthorized activities associated with threat actors.

A conventional user identification protocol requires users to submit knowledge-based data, such as a password and user ID, in order to gain access to a computer system. A submitted user ID may be used to reference a password associated with the user ID, with the passwords being compared to determine whether a particular user is authorized to access the system. Other approaches have integrated other categories of data such as biometrics-based data, for example, fingerprints, voiceprints, and device-based authentication, such as a phone, computer or other device which can be recognized to identify authorized users. Some systems require only a single logon/login event; other systems continuously verify and/or require additional verification of a user for conducting additional and/or specific transactions by sending a verification code or token to a user's device.

Poor user practices, specifically, related to knowledge factors used for authentication contribute to system vulnerability. Poor password management practices can include using the same password for all sign-ins, minimally varying passwords when updating, use of easy-to-remember passwords, formulaic passwords, and/or to providing easily mined personal data as answers to security questions. Moreover, a general lack of appreciation for indiscreet posting of information which can be mined from social networks and/or contained in other public domain sources; and/or, casual attitudes towards maintaining device security which can result in physical theft of the device, cloning risks, malware downloads or virus infection through the use of open WiFi networks and/or downloads of trojan-type applications.

Systems and methods for creating an image and/or automatically interpreting images are disclosed in U.S. patent application Ser. Nos. 16/427,305, 16/262,884 which in their entirety are incorporated herein by reference.

Systems and methods for generating composite images are disclosed U.S. patent application Ser. No. 15/884,565, which in its entirety is incorporated herein by reference.

A method and system for creating dynamic visual illusions using complex, juxtaposed ambiguous images are disclosed in U.S. Provisional Patent Application No. 62/499,655, which in its entirety is incorporated herein by reference.

A multi-purpose interactive cognitive platform is disclosed in U.S. patent application Ser. No. 16/262,884, which in its entirety is incorporated herein by reference.

SUMMARY

The following embodiments and aspects thereof are described and illustrated in conjunction with systems, tools and methods which are meant to be exemplary and illustrative, not limiting in scope.

There is provided, in accordance with an embodiment, a method for authenticating a user identity according to predetermined user interactions, including using at least one hardware processor for obtaining at least one image from a database; presenting the at least one image to a user through an authentication interface; requesting from the user at least one user interaction related to the at least one image; obtaining an input including at least one user interaction input; comparing the at least one user interaction input with the at least one user interaction to validate the user identity and to validate the user is a human; providing an indication regarding the user identity according to a result of comparing the at least one user interaction input with the at least one user interaction.

In certain embodiments, the method further includes using the at least one hardware processor for providing an identity generating interface enabling a user to select a username; receiving from the user via an input at least two images; generating a composite image from the at least two images; receiving from the user at least one user interaction that is associated with the composite image that enables the user to authenticate the user identity; and, storing the composite image and the at least one user interaction with the user identity.

In certain embodiments, the method further includes using the at least one hardware processor for extracting a subset of metadata from the at least one image to generate an alphanumeric password operative to authenticate the user identity.

In certain embodiments, the indication is that the at least one user interaction input does not match the at least one user interaction and further includes using the at least one hardware processor for counting a number of user attempts to validate the user identity; comparing the number of user attempts to a predetermined attempts number; generating a flag where the number of user attempts matches the predetermined number of attempts, providing the flag to a regulating entity to deny the user access.

In certain embodiments, the indication is that the at least one user interaction input matches the at least one user interaction and further includes using the at least one hardware processor for authenticating the user identity and the user status as a human; allowing the user access.

In certain embodiments, the method further includes using the at least one hardware processor for providing a sequence of interactions as a second authentication process; obtaining user inputs responsive to the sequence of interactions displayed; comparing the user inputs with the sequence of interactions; providing an indication regarding the user identity according to a result of comparing the user inputs and the sequence of interactions.

In certain embodiments, the at least one image is a composite image generated from at least two or more images.

In certain embodiments, the composite image requires a user to virtually reassemble the spatially separated image parts of the composite image by virtually reconstructing an intact image of one of the at least two images image.

In certain embodiments, the user interaction enables detecting a non-human threat by requiring the user to match image sections of the composite image.

In certain embodiments, the method further includes using the at least one hardware processor for providing the user with a marking tool configured to mark portions of the at least one image, receiving at least one marking performed by the user that indicate a sequence of interactions with the at least one image, wherein the sequence of interactions provides the user authentication.

There is further provided, in accordance with an embodiment, a computer program product to facilitate authenticating a user identity, the computer program product including a non-transitory computer-readable storage medium having program code embodied therewith, the program code executable by at least one hardware processor to obtain at least one image from a database present the at least one image to a user through an authentication interface request from the user at least one user interaction related to the at least one image obtain an input including an at least one user interaction input compare the at least one user interaction input with the at least one user interaction to validate the user identity and to validate the user is a human providing an indication regarding the user identity according to a result of comparing the at least one user interaction input with the at least one user interaction.

In certain embodiments, the computer program product further includes the program code executable by at least one hardware processor to provide an identity generating interface enabling a user to select a username receive from the user via an input at least two images generate a composite image from the at least two images receive from the user at least one user interaction that is associated with the composite image that enables the user to authenticate the user identity store the composite image and the at least one user interaction with the user identity.

In certain embodiments, the computer program product further includes the program code executable by at least one hardware processor to extract a subset of metadata from the at least one image to generate an alphanumeric password operative to authenticate the user identity.

In certain embodiments, the indication is that the at least one user interaction input does not match the at least one user interaction and further includes program code executable by at least one hardware processor to count a number of user attempts to validate the user identity compare the number of user attempts to a predetermined attempts number generate a flag where the number of user attempts matches the predetermined number of attempts, provide the flag to a regulating entity to deny the user access.

In certain embodiments, the indication is that the at least one user interaction input matches the at least one user interaction and further includes program code executable by at least one hardware processor to authenticating the user identity and the user status as a human allowing the user access.

In certain embodiments, the computer program product further includes the program code executable by at least one hardware processor to provide a sequence of interactions as a second authentication process obtain user inputs responsive to the sequence of interactions displayed, compare the user inputs with the sequence of interactions, provide an indication regarding the user identity according to a result of comparing the user inputs and the sequence of interactions.

In certain embodiments, the at least one image is a composite image generated from at least two or more images.

In certain embodiments, the composite image requires a user to users virtually reassemble the spatially separated image parts of the composite image by virtually reconstructing an intact image of one of the at least two images image.

In certain embodiments, the user interaction enables detecting a non-human threat by requiring the user to match image sections of the composite image.

In certain embodiments, the computer program product further includes the program code executable by at least one hardware processor to provide the user with a marking tool configured to mark portions of the at least one image, receive at least one marking performed by the user that indicate a sequence of interactions with the at least one image, wherein the sequence of interactions provides the user authentication.

There is further provided, in accordance with an embodiment, a system configured to authenticate a user identity according to predetermined user interactions, including at least one hardware processor configured to obtain at least one image from a database present the at least one image to a user through an authentication interface, request from the user at least one user interaction related to the at least one image, obtain an input including an at least one user interaction input, compare the at least one user interaction input with the at least one user interaction to validate the user identity and to validate the user is a human, providing an indication regarding the user identity according to a result of comparing the at least one user interaction input with the at least one user interaction, a display configured to present the user with the authentication interface and with an indication as to a verification of the user identity, an input configured to obtain the input and provide the input to the at least one processor.

In certain embodiments, the system further includes a user identity database configured to the user at least one user interaction that is associated with the at least one image, wherein the at least one user interaction is associated with the at least one image when the user creates the user identity.

In certain embodiments, the at least one processor is further configured to provide an identity generating interface enabling a user to select a username, receive from the user via an input at least two images, generate a composite image from the at least two images, receive from the user at least one user interaction that is associated with the composite image that enables the user to authenticate the user identity, and store at the user identity database the composite image and the at least one user interaction with the user identity, wherein the identity generating interface is displayed to the user via the display.

In certain embodiments, the at least one processor is further configured to extract a subset of metadata from the at least one image to generate an alphanumeric password operative to authenticate the user identity.

In certain embodiments, the indication is that the at least one user interaction input does not match the at least one user interaction and the at least one processor is further configured to count a number of user attempts to validate the user identity, compare the number of user attempts to a predetermined attempts number, generate a flag where the number of user attempts matches the predetermined number of attempts, provide the flag to a regulating entity to deny the user access.

In certain embodiments, the indication is that the at least one user interaction input matches the at least one user interaction and the at least one processor is further configured to authenticating the user identity and the user status as a human, allowing the user access.

In certain embodiments, the at least one processor is further configured to provide a sequence of interactions as a second authentication process, obtain user inputs responsive to the sequence of interactions displayed, compare the user inputs with the sequence of interactions, provide an indication regarding the user identity according to a result of comparing the user inputs and the sequence of interactions.

In certain embodiments, the at least one image is a composite image generated from at least two or more images.

In certain embodiments, the composite image requires a user to users virtually reassemble the spatially separated image parts of the composite image by virtually reconstructing an intact image of one of the at least two images image.

In certain embodiments, the user interaction enables detecting a non-human threat by requiring the user to match image sections of the composite image.

In certain embodiments, the at least one processor is further configured to provide the user with a marking tool configured to mark portions of the at least one image, receive at least one marking performed by the user that indicate a sequence of interactions with the at least one image, wherein the sequence of interactions provides the user authentication.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described.

Figure 1:
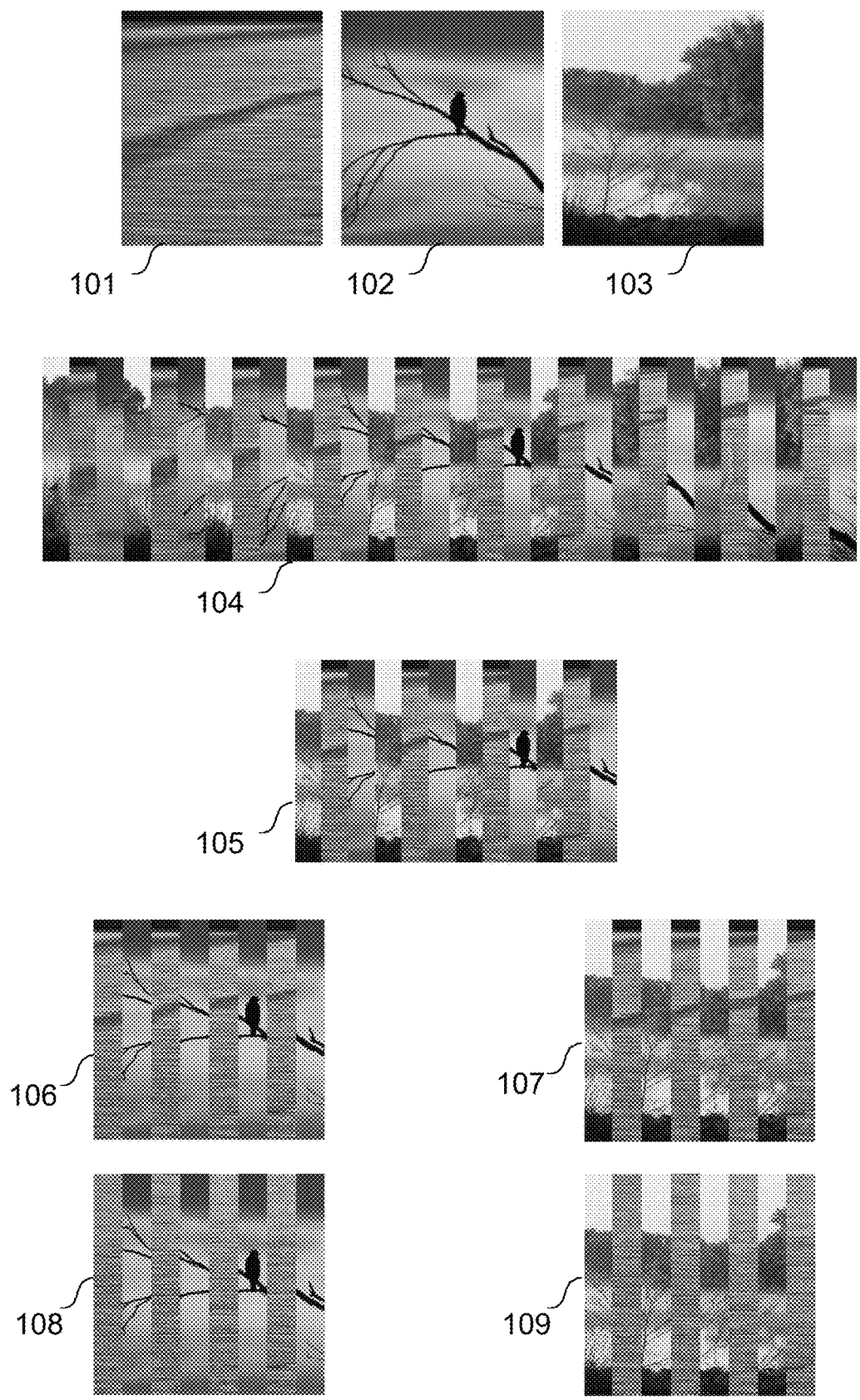

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 2:
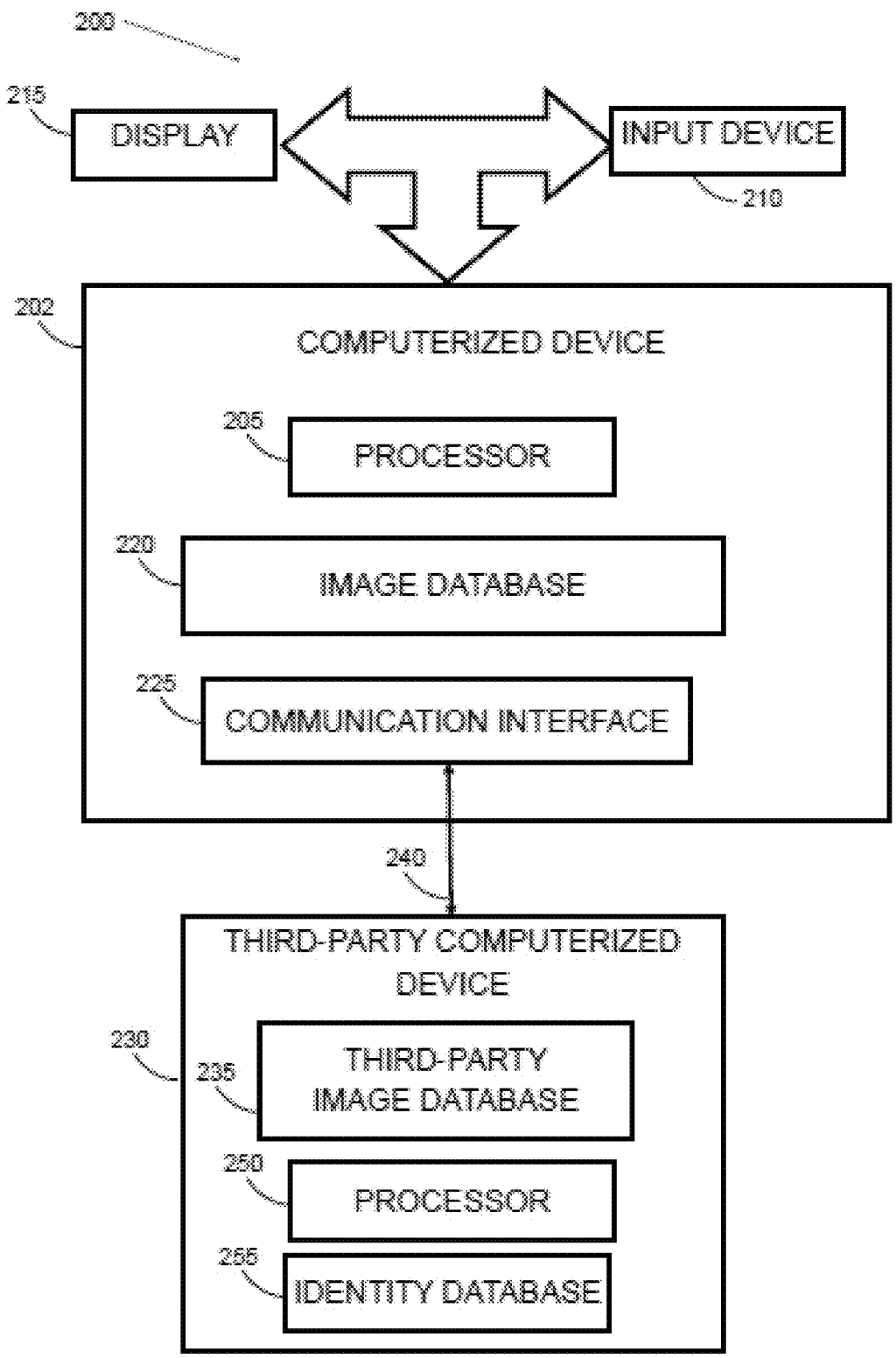
Figure 3:
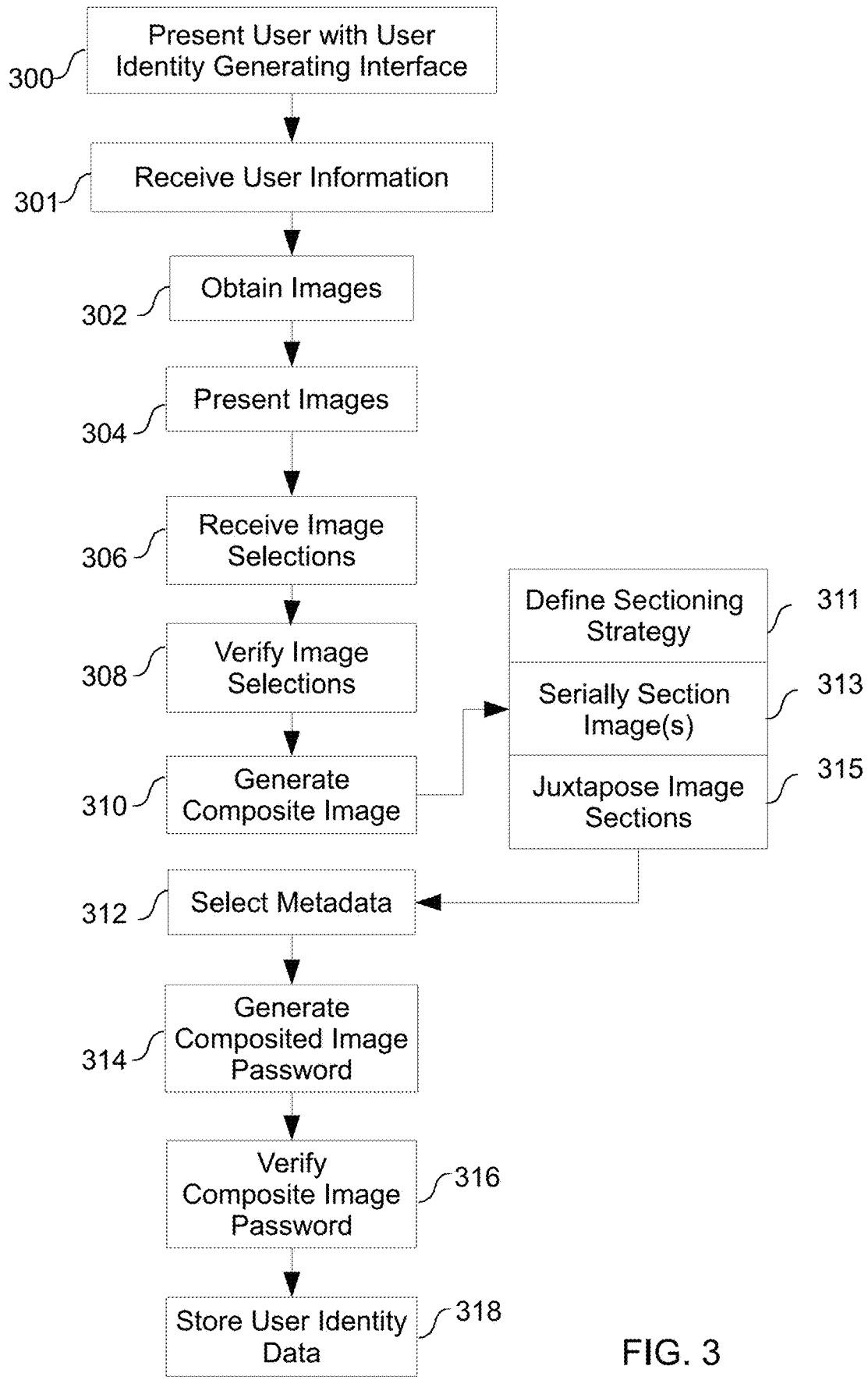
Figure 4:
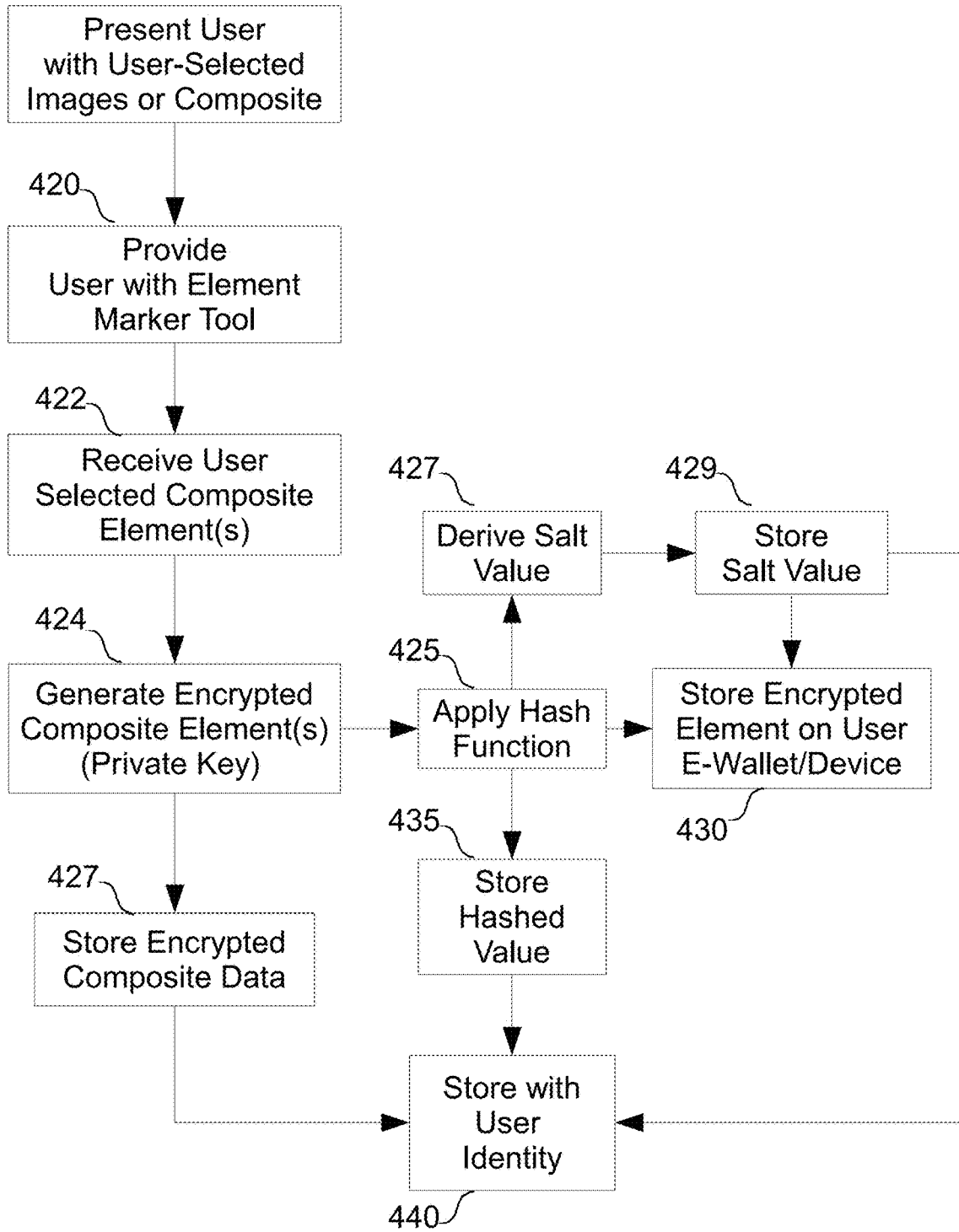
Figure 5A:
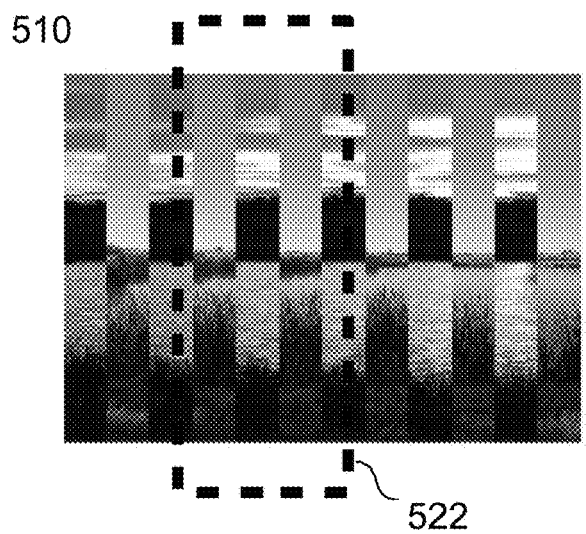
Figure 5A:
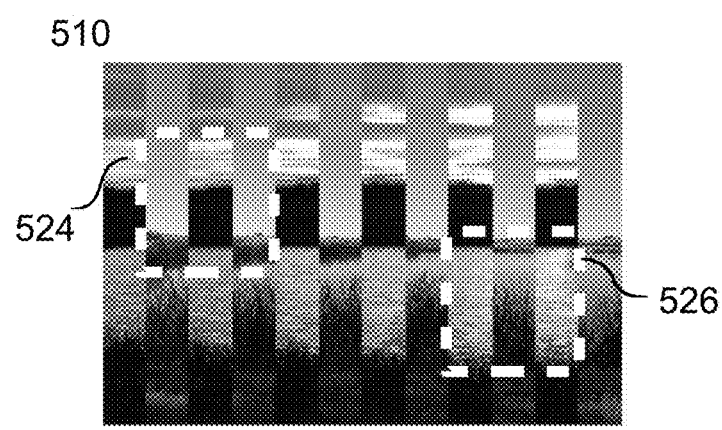
Figure 5A:
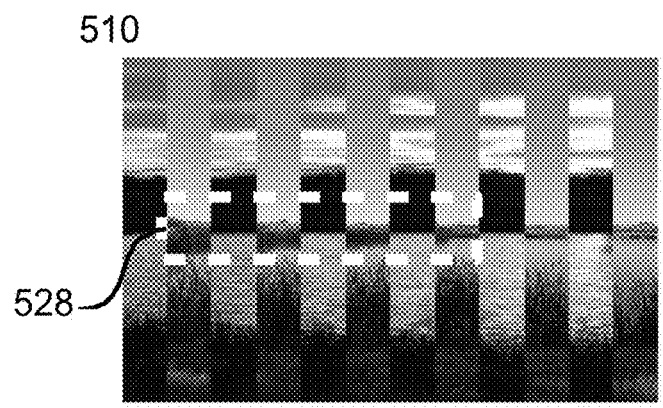
Figure 5B:
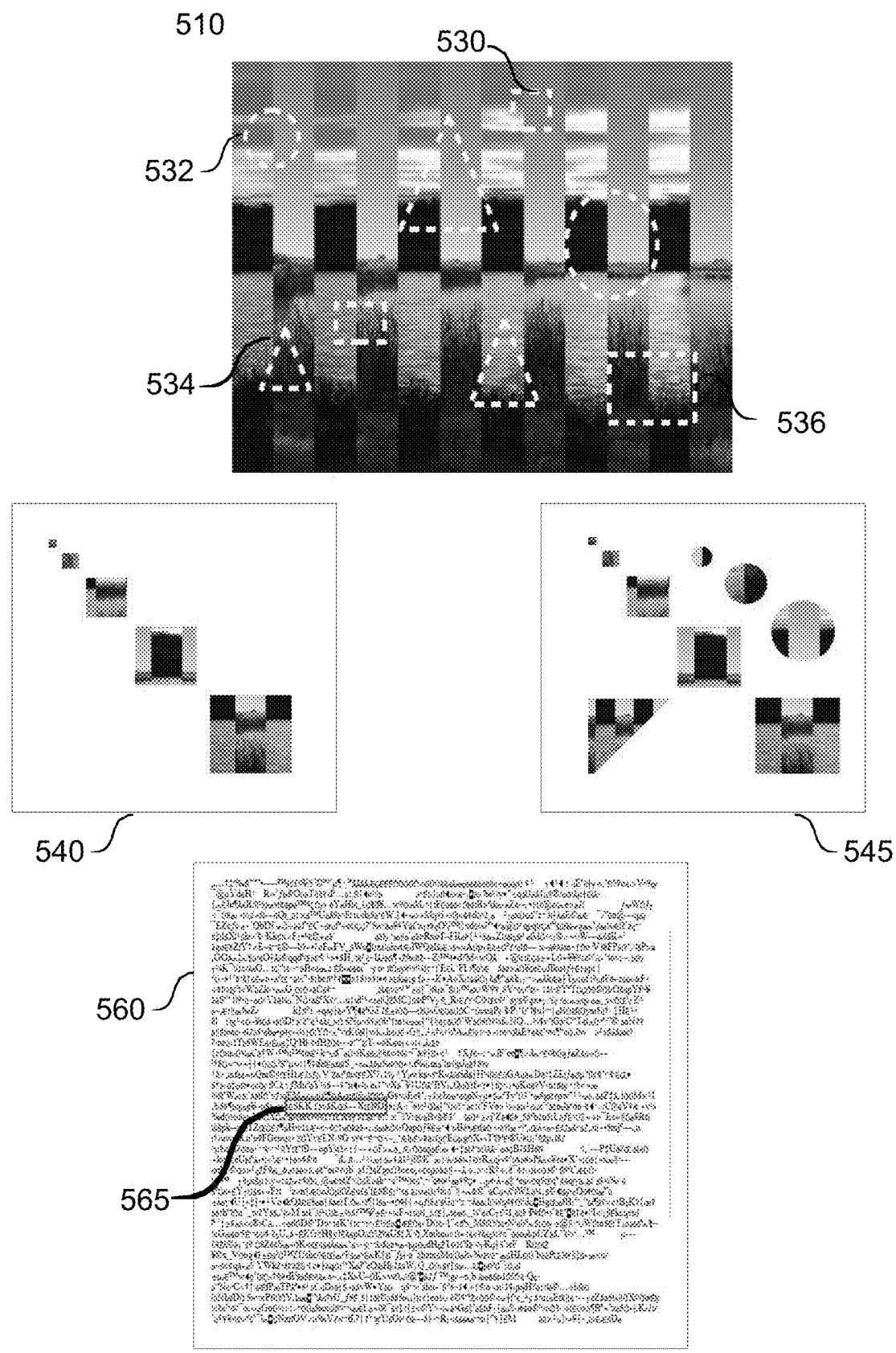
Figure 6:
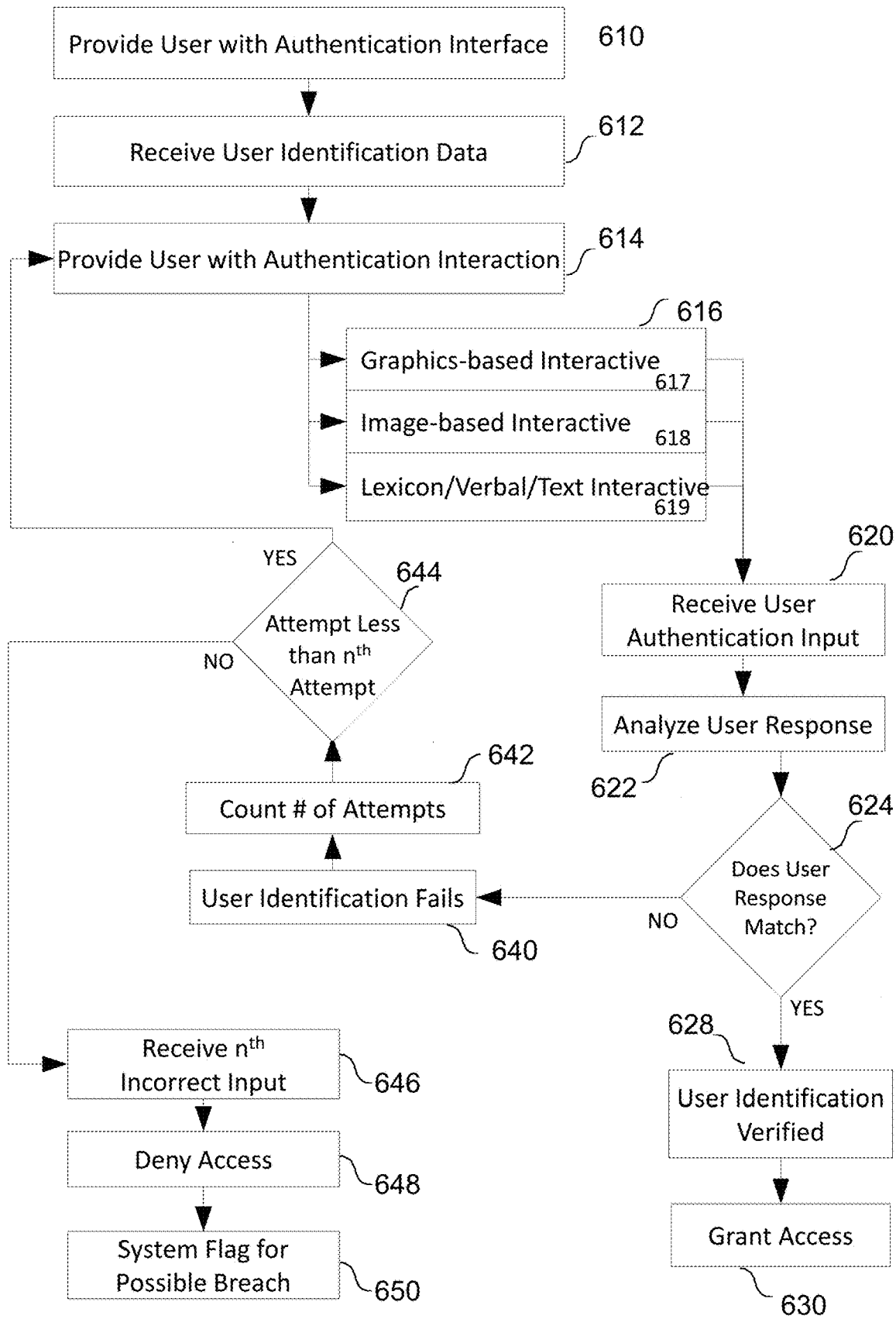
Figure 7A:
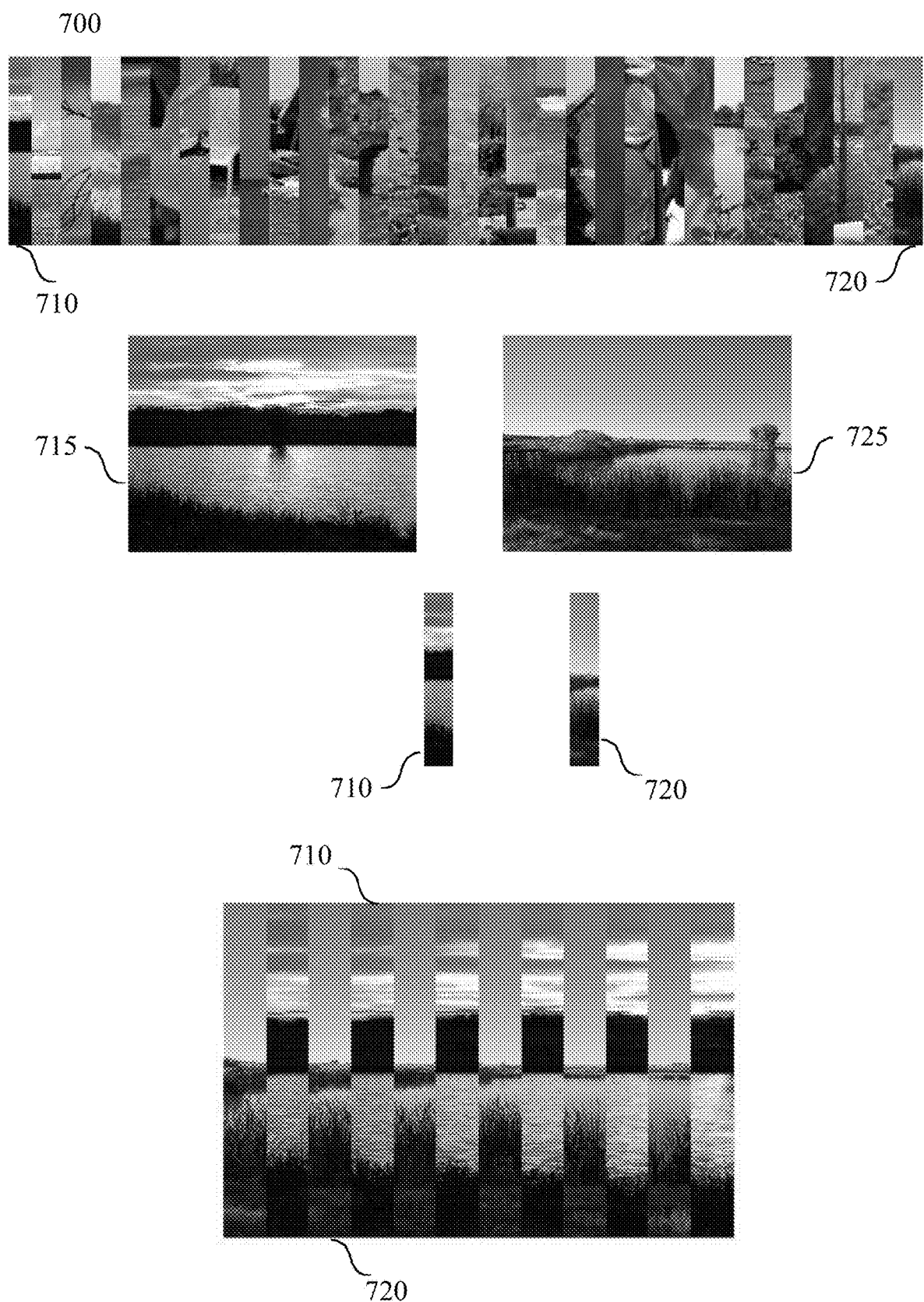
Figure 7B:
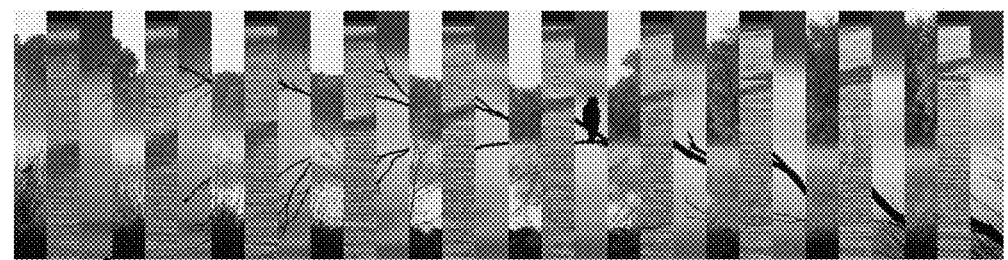
Figure 7B:
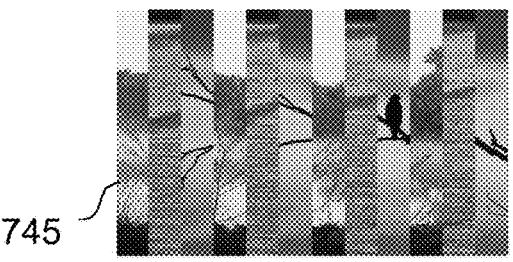
Figure 7B:
Figure 7B:
Figure 7B:
Figure 7B:
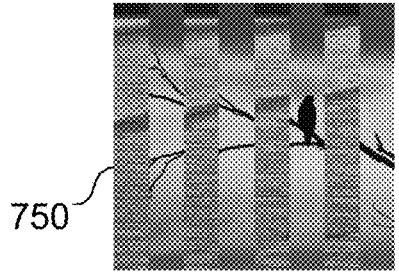
Figure 7B:
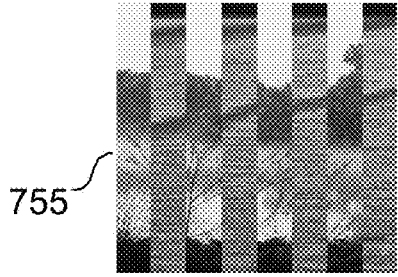
Figure 7B:
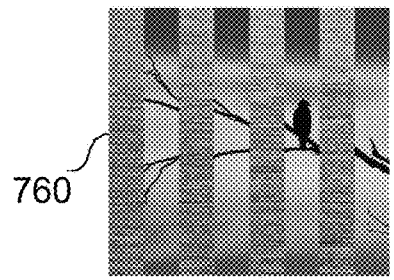
Figure 7B:
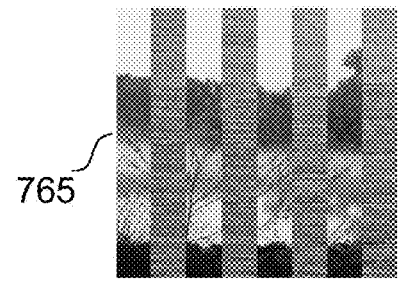
Figure 8A:
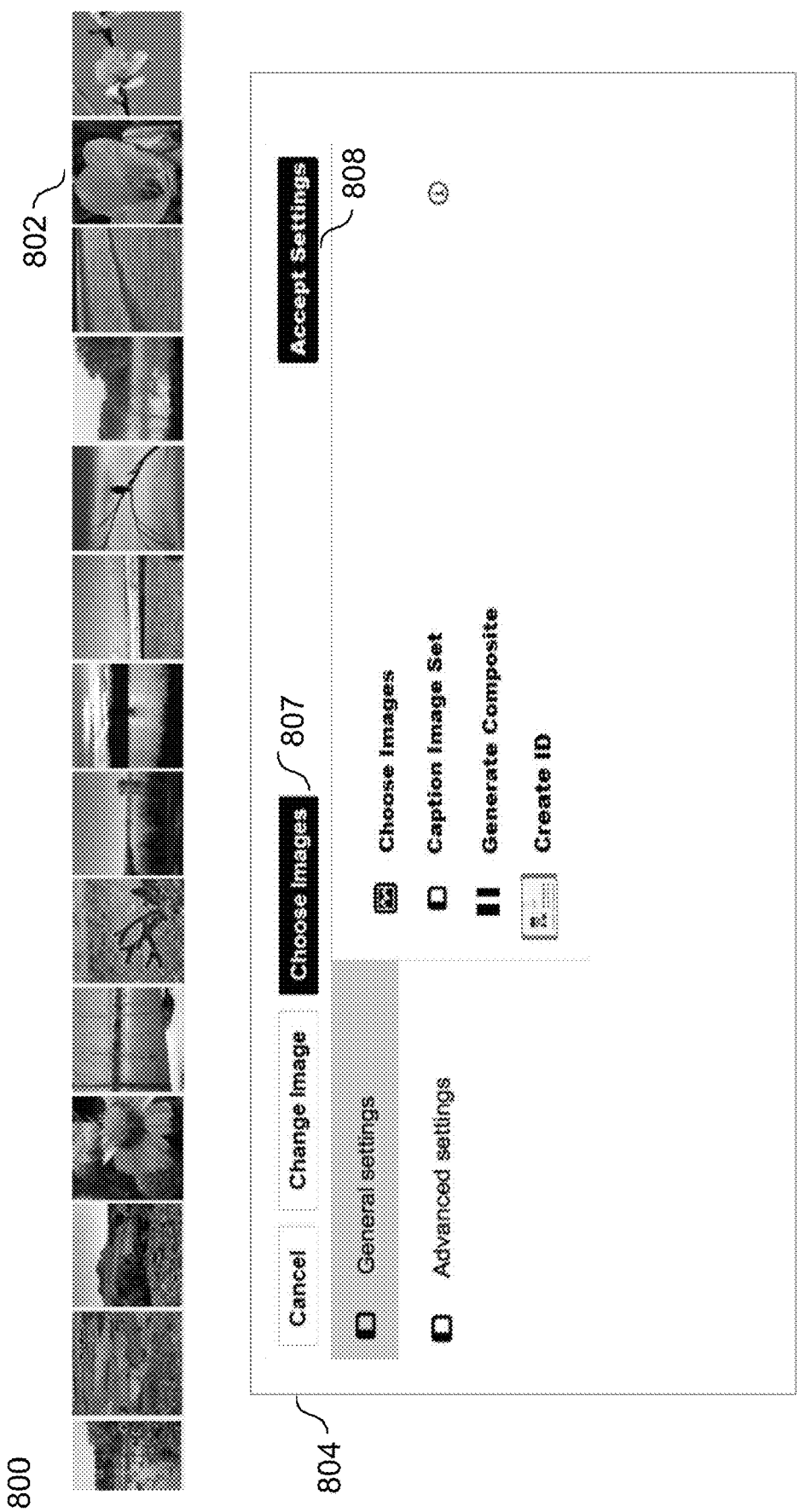
Figure 8B:
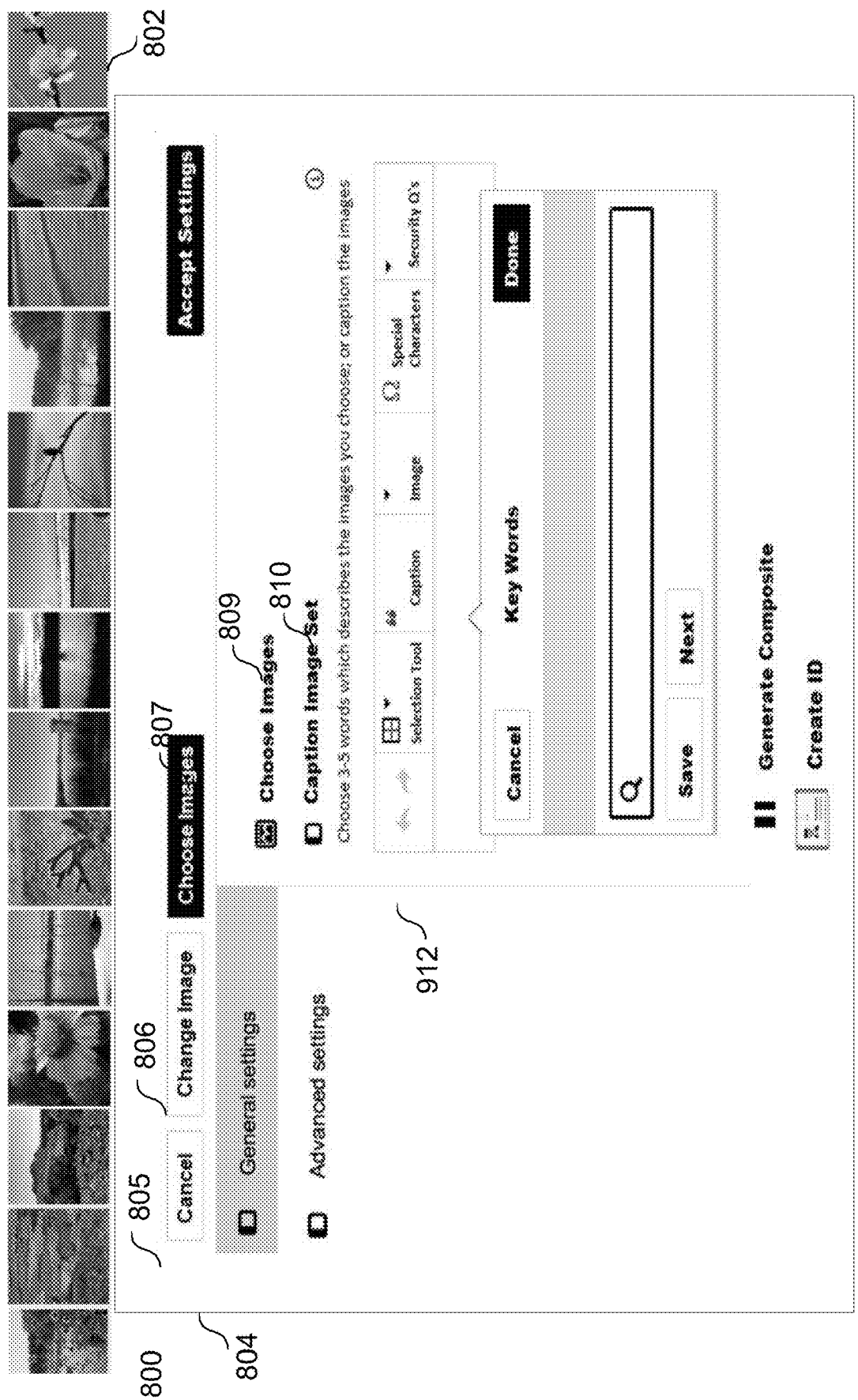
Figure 8C:
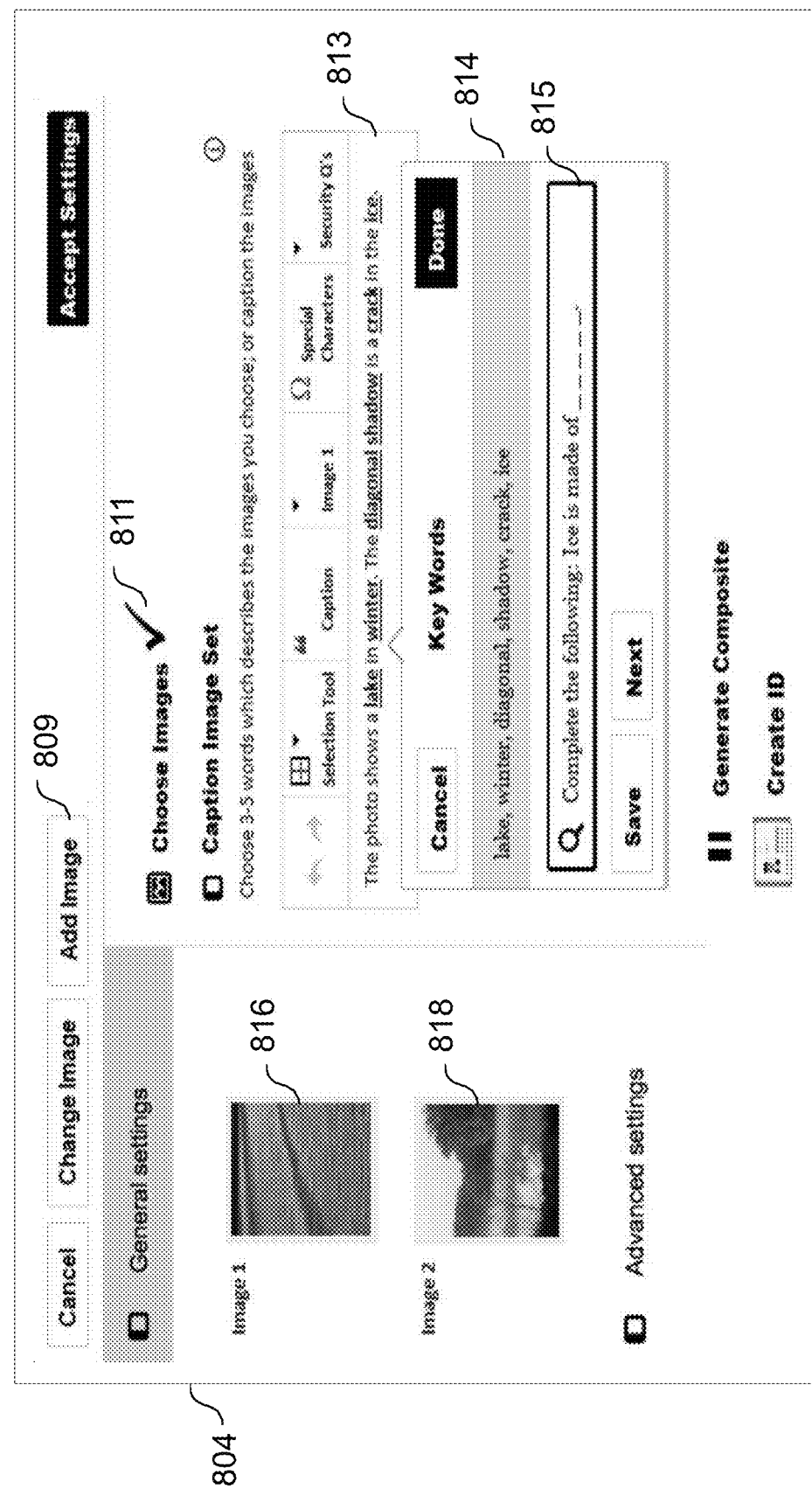
Figure 8D:
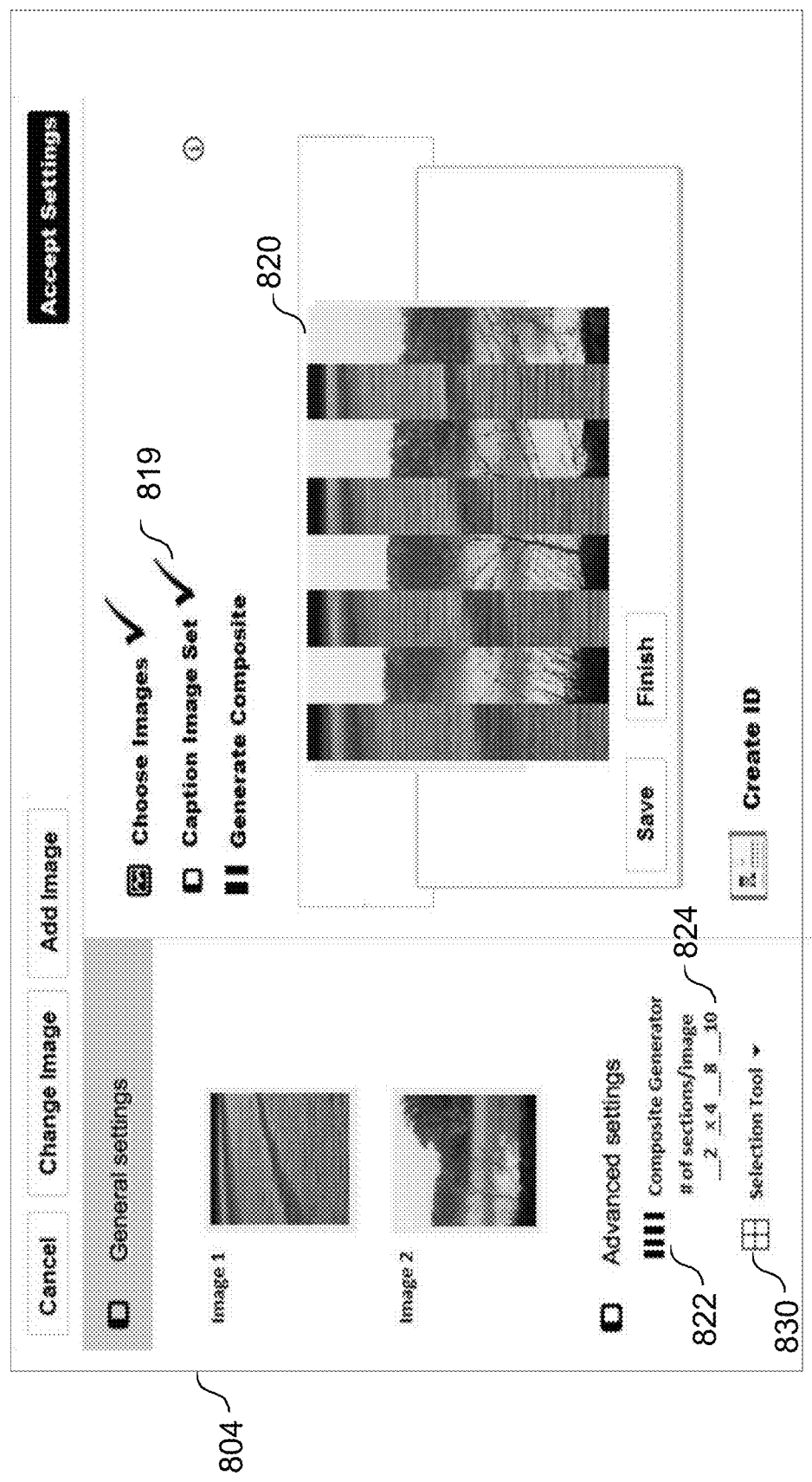
Figure 8E:
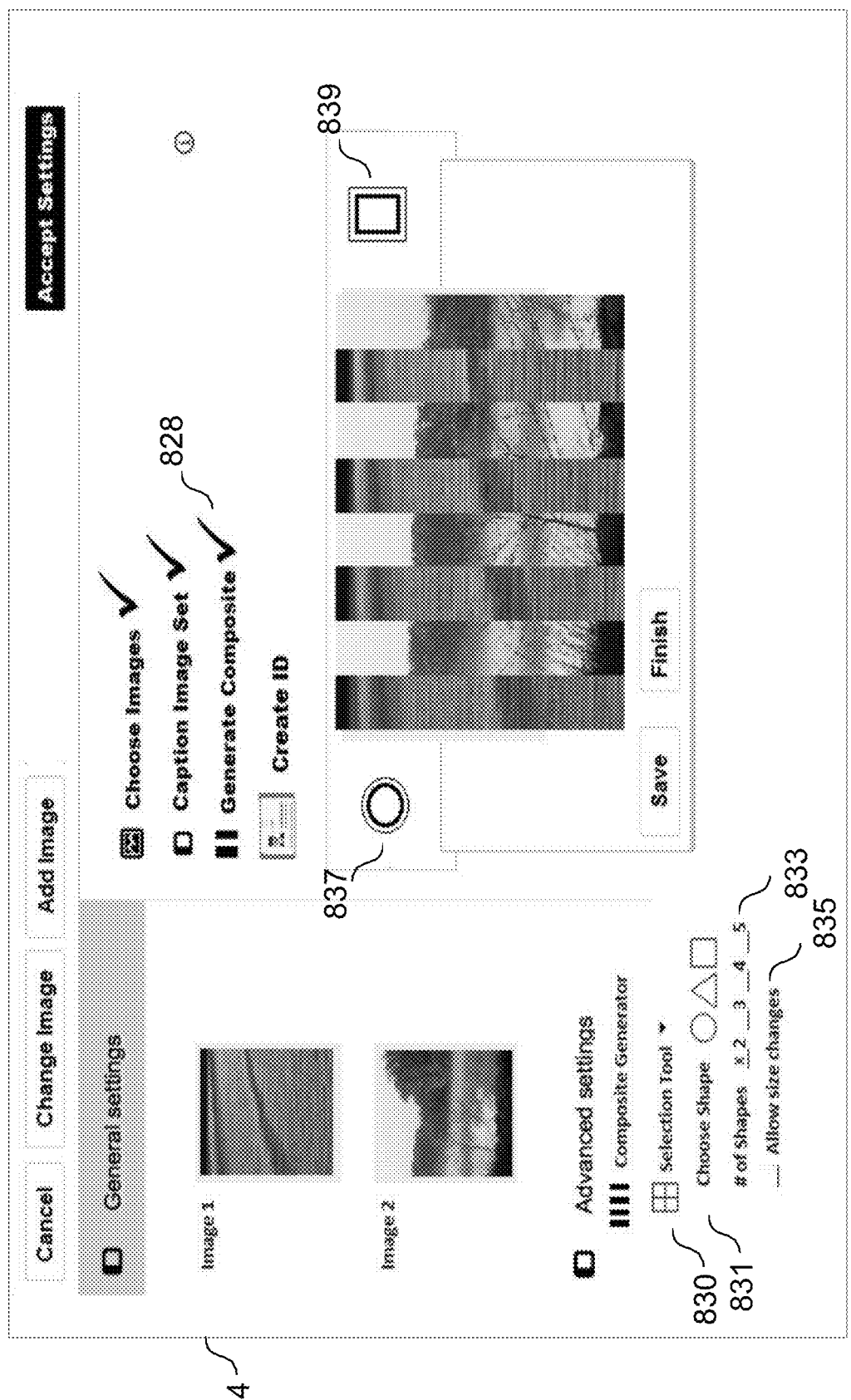
Figure 8F:
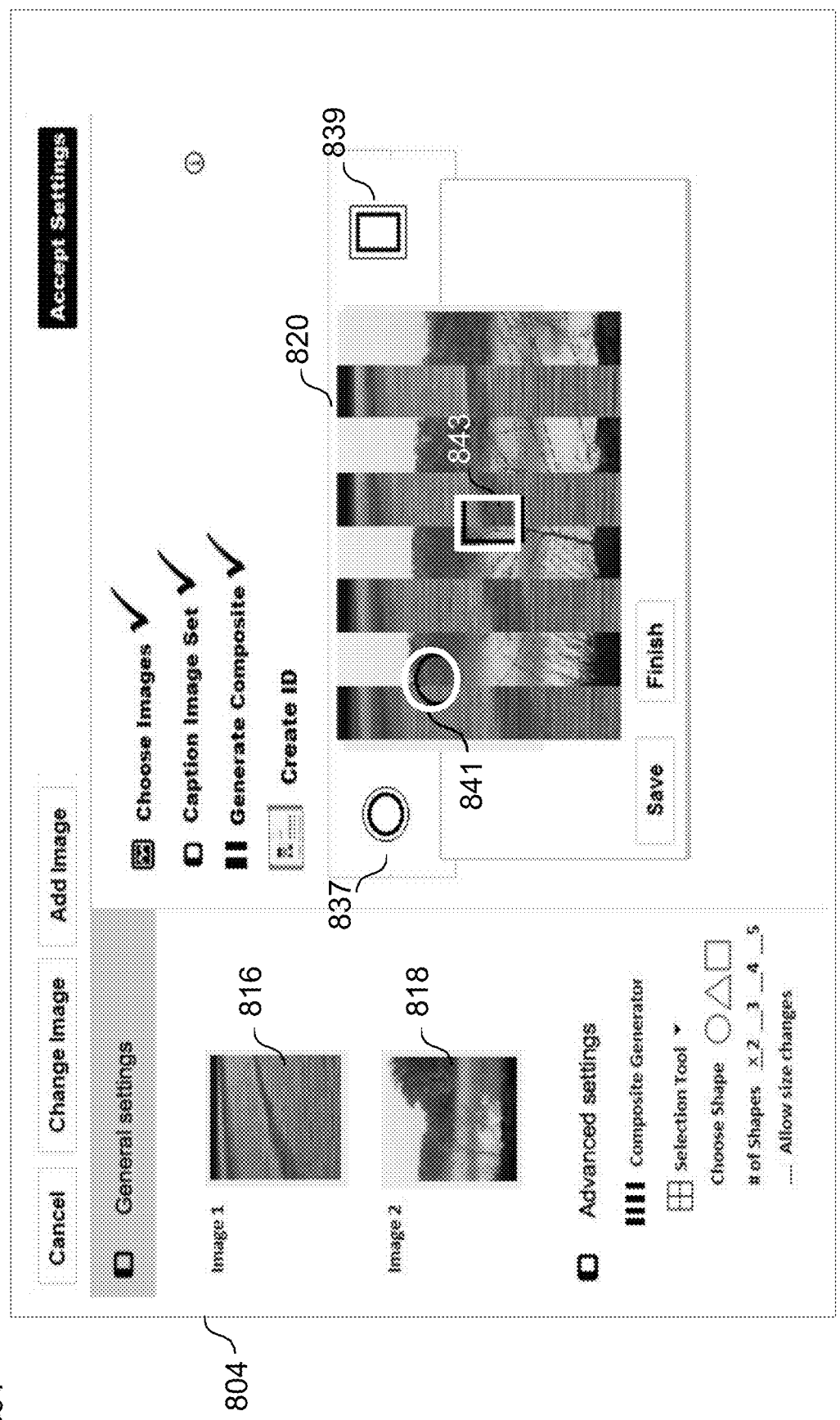
Figure 8G:
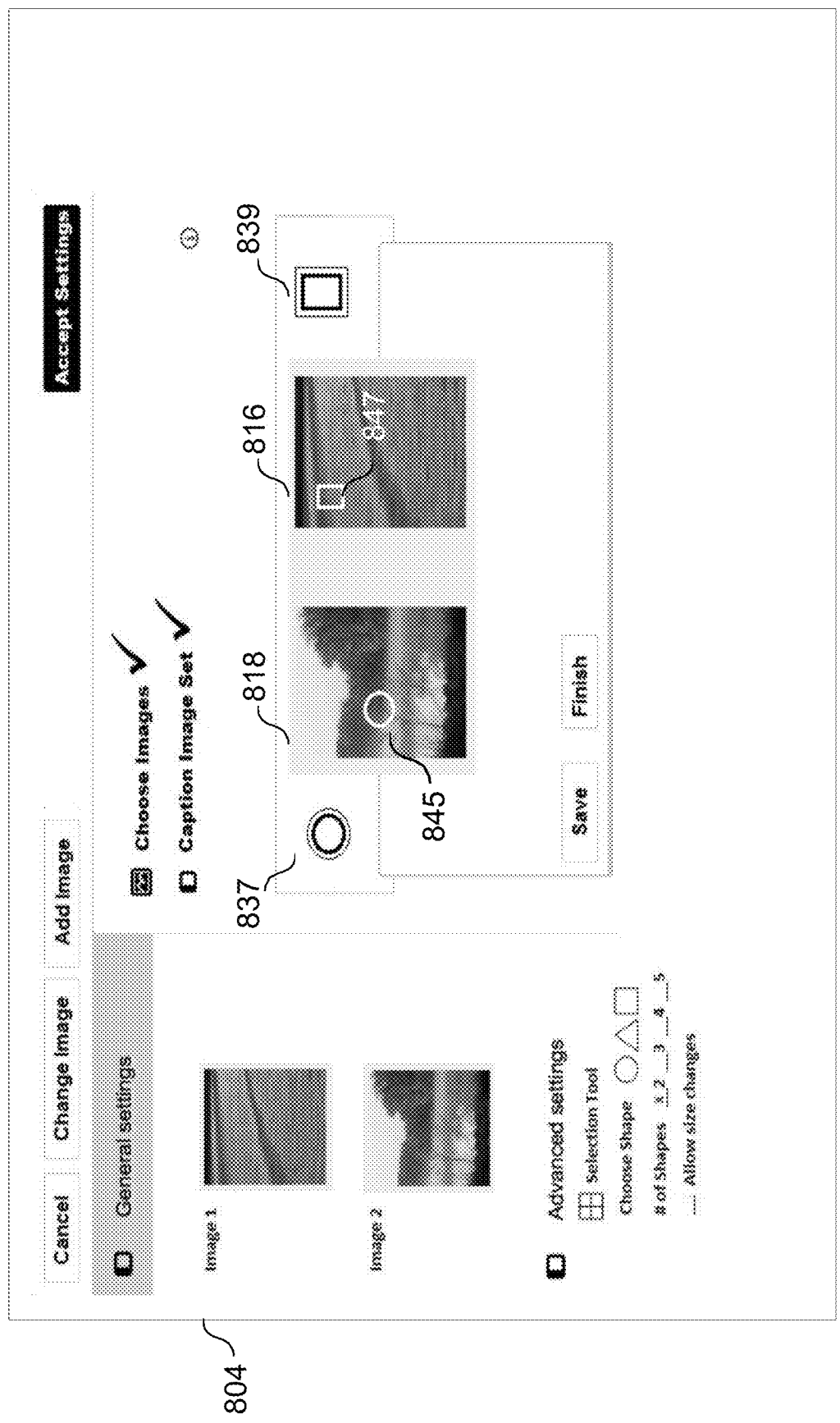
Figure 9A:
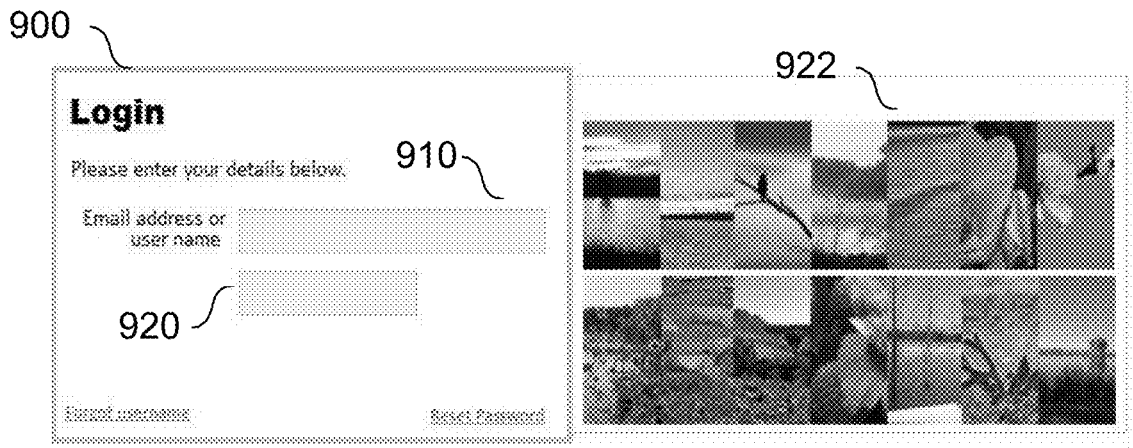
Figure 9B:
Figure 9C:
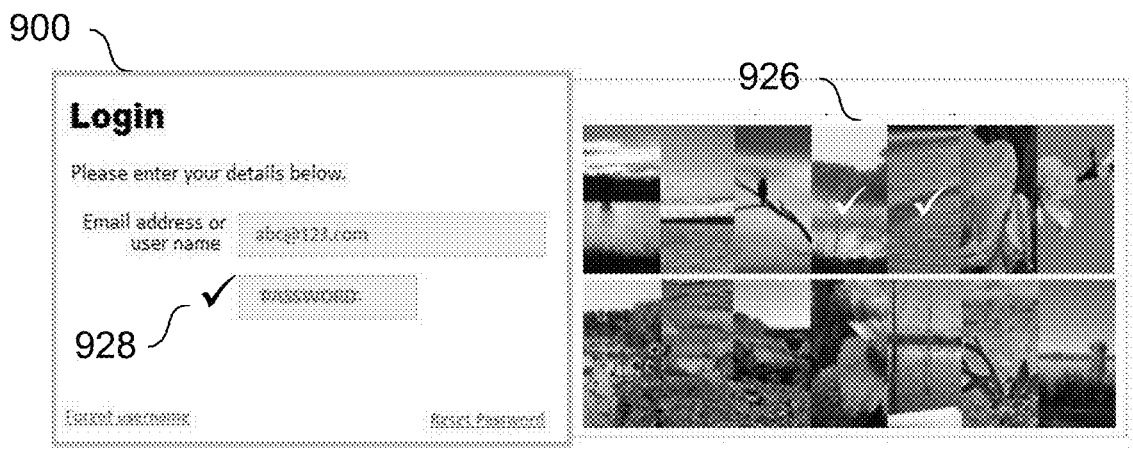
Figure 9D:
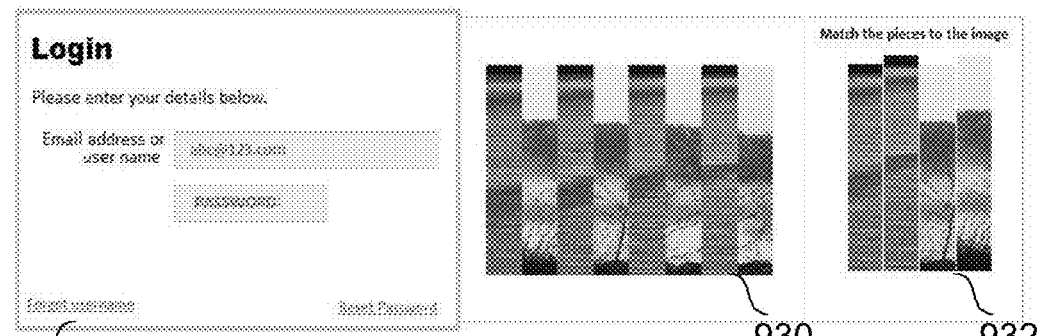
Figure 9E:
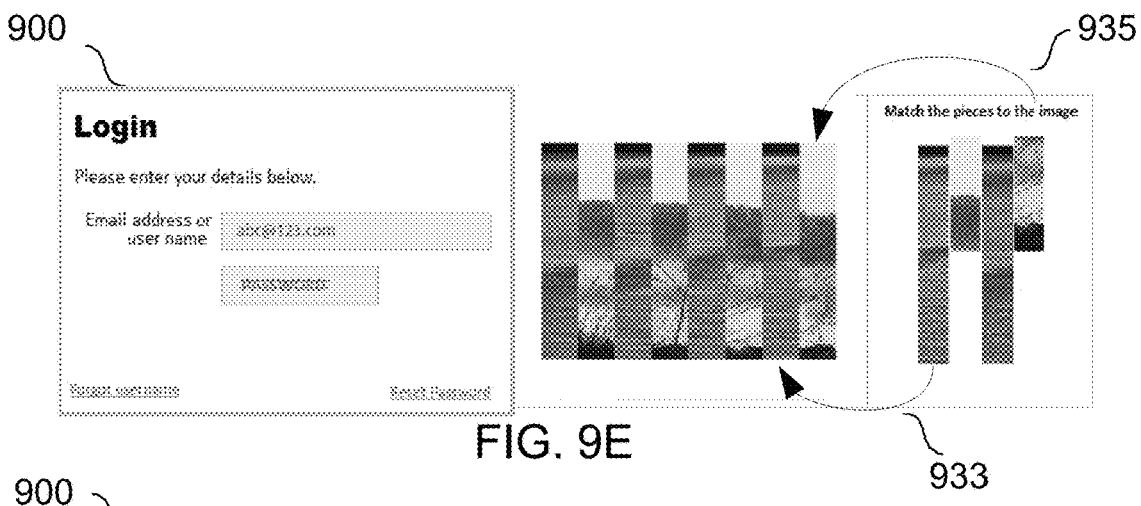
Figure 9F:
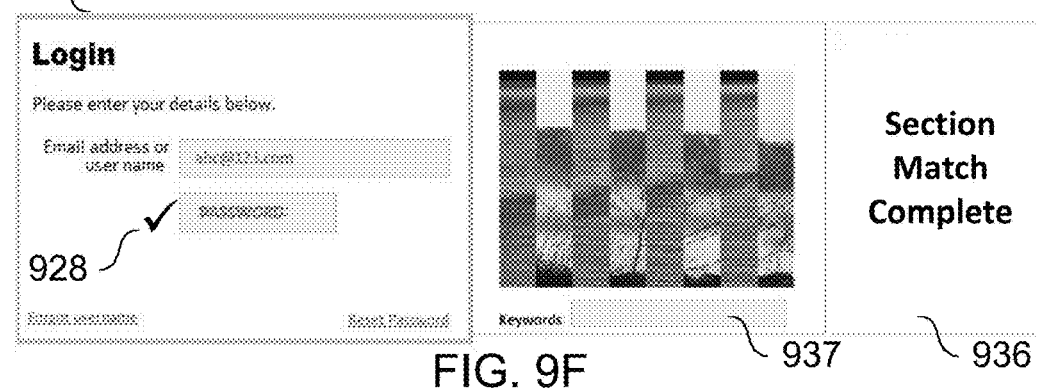
Figure 9G:
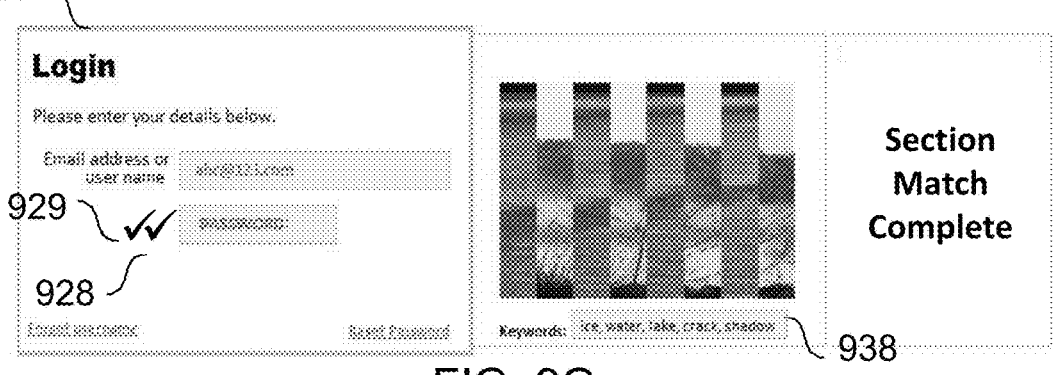
Figure 9H:
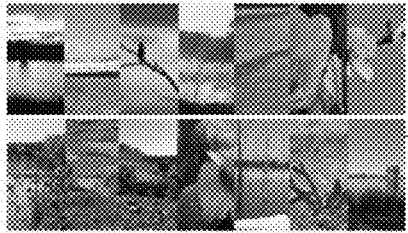
Figure 9I:
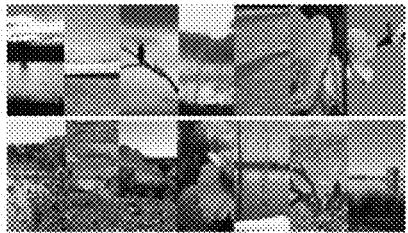
Figure 9J:
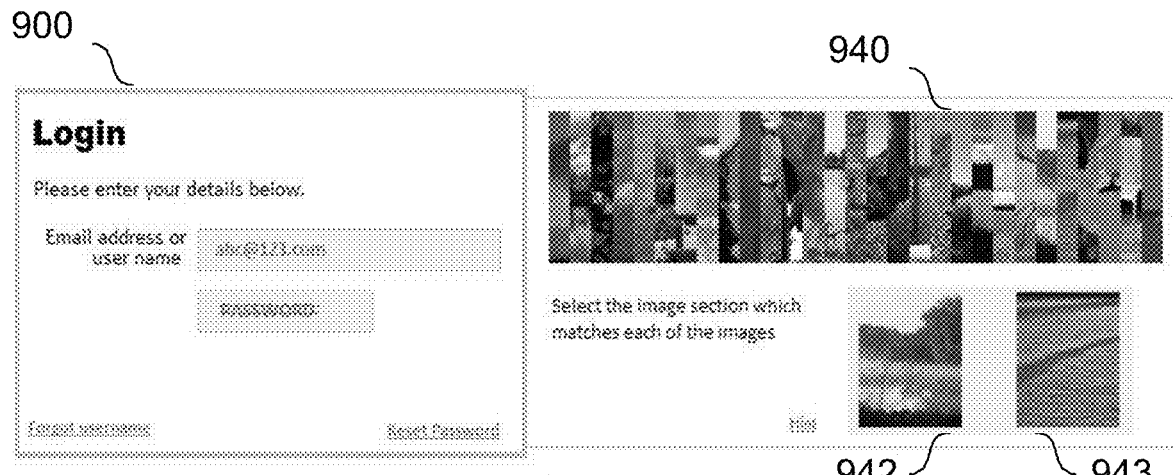
Figure 9K:
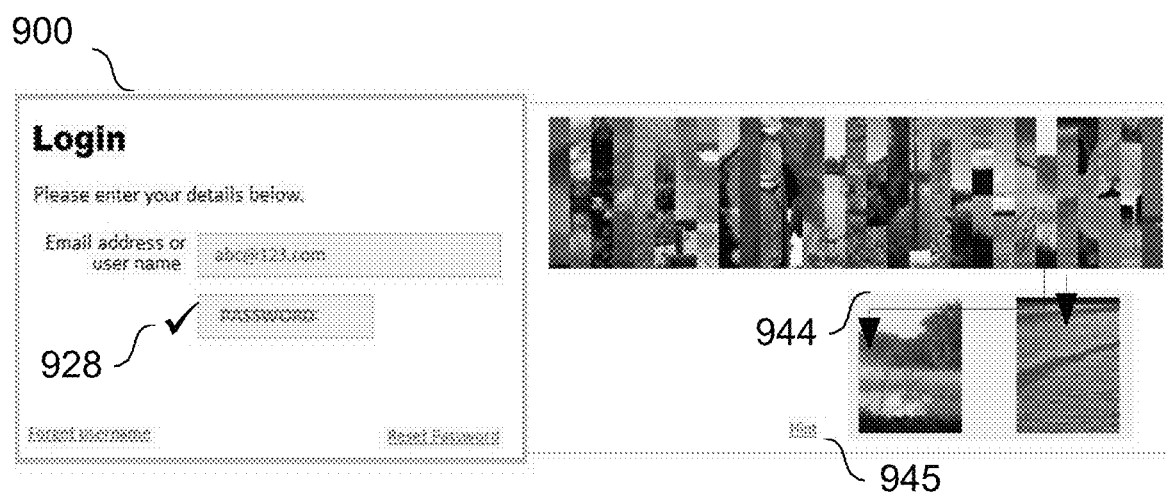
Figure 9L:
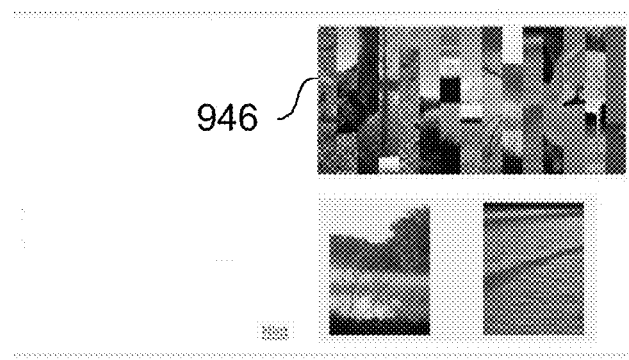
Figure 9M:
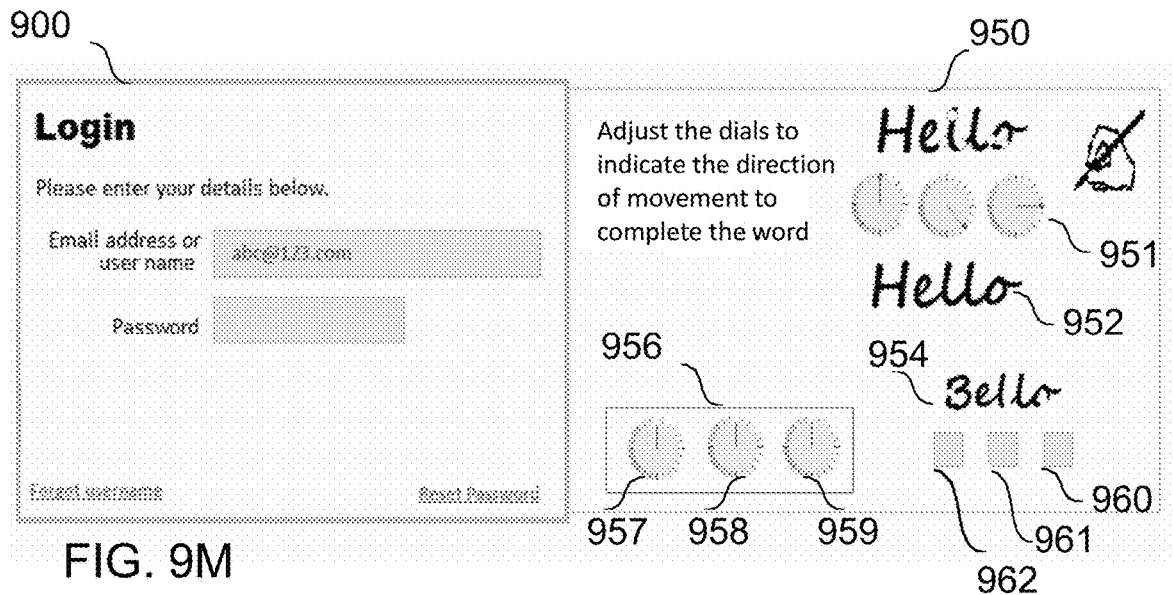
Figure 9N:
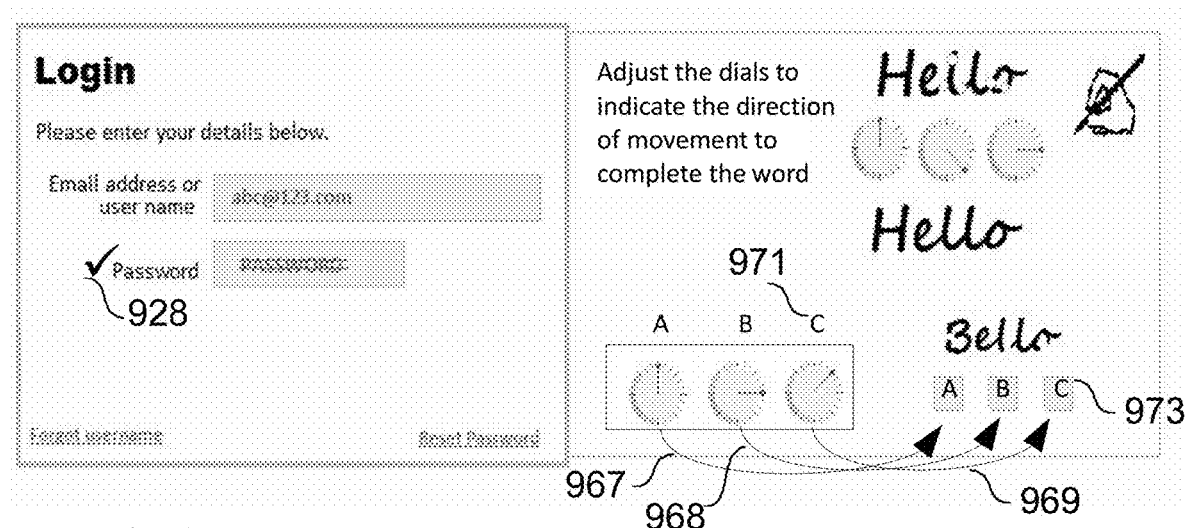

FIG. 1 illustrates images used for generating a three-image composite image, according to certain embodiments of the subject matter;

FIG. 2 schematically illustrates a system configured to facilitate user authentication according to interactions of a user, according to certain embodiments;

FIG. 3 schematically illustrates a method for generating a user identity and authentication protocol through generating a composite image, according to certain embodiments;

FIG. 4 schematically illustrates a method for generating a user authentication according to generating a composite image and utilizing image-based metadata to derive an alphanumeric password, according to certain embodiments;

FIGS. 5A-5B schematically illustrate extraction of metadata from the composite image thereby generating a user authentication of the user identity which is linked to the user-defined composite image, according to certain embodiments;

FIG. 6 schematically illustrates a method for authenticating of the user identity, according to certain embodiments;

FIGS. 7A-7B illustrate composite image interactions enabling the authentication of the user identity, according to certain embodiments;

FIGS. 8A-8G schematically illustrate the user identity generating interface, according to certain embodiments; and, FIGS. 9A-9N schematically illustrate the user authentication interface, according to certain embodiments.

DETAILED DESCRIPTION

A general non-limiting overview of practicing the present disclosure is presented below. The overview outlines exemplary practice of embodiments of the present disclosure, providing a constructive basis for variant and/or alternative and/or divergent embodiments, some of which are subsequently described.

Described herein is a system and method for user recognition based on cognitive interactions, according to exemplary embodiments. User recognition or identification based on cognitive interactions can involve verifying a user identity thereby authorizing a user to access a system, application, permission to retrieve documents, permission to share documents, execute transactions and/or the like. The system and methods disclosed herein integrate human cognitive capacity and the centrality of a user in managing identity security and authentication processes through cognitively based interactions. In certain embodiments, the user and the system operate together in cooperation to develop image-linked alphanumeric passwords and in authenticating human user identity through cognitive interactions.

FIG. 1 illustrates images, generally referenced as 101, 102, 103, used for generating one or more three-image composite images, referenced generally as 104, 105, according to certain embodiments of the subject matter. Three-image composite images 104, 105, are generated according to one sectioning strategy and derivative two-image composite images, generally referenced as 106, 107, 108, 109, including a modification of figure-ground dynamics in derived two-image composite image 106, 107 to generate images 108, 109.

Images 106, 107, 108, 109 are divided into two categories: stable images and multi-stable images. Stability refers to the perceptual stability as to whether the images portray a dynamic or stable figure-ground interaction. Both stable and multi-stable convey an illusion of depth resulting from the juxtaposition of non-adjacent image sections from two or more images in an interleaved pattern. A figure-ground relationship is established where at least one of the images of the composite image set is perceived to assume a dominant background—ground—position and the other images are seen in the foreground—figure. With a three-image composite image, the foreground component is a doublet, including two component images. These foreground components appear as pop-out columns. In the stable configuration, whether as a two-image composite image or a three-image composite image set, the stable position is where one of the component images assumes a ground position and where the other image or images assume a figure position.

A dynamic state of the composite image is referred to as multi-stable for three-image composites and bi-stable for two-image composite image sets. The dynamic state results in a perceptual switch between the images which are perceived to be in the ground position of the composite images 104 and 105.

Images 106, 107 are derivative two-image composites of 101 and 102, and 101 and 103, respectively. Images 106 and 107 are bi-stable image sets in that the images can dynamically switch between figure and ground positions. Images 106 and 107 can be transformed from their bi-stable state to a stable state by removing specific image characteristics, such as contiguities, from the image sets as shown in 108 and 109, respectively. Contiguities are described below.

FIG. 2 schematically illustrates a system 200 for user recognition, according to exemplary embodiments of the disclosed subject matter. System 200 is a network of systems including multiple machines communicating via a network, which may be used for user authentication and identification. For example, system 200 may analyze images, and/or create artistic images by combining multiple images into one or more composite images, such as by interweaving multiple images with one another, which a user may interact with as part of an interactivity. The image sets can embed multiple Gestalt principles (figure-ground, closure, continuation), engaging top-down cognition and bottom-up sensory processing, as users virtually reassemble the spatially separated image parts by virtually reconstructing the intact image of the image occupying the ground position.

System 200 can include a computerized device 202 having an input 210 configured to obtain interactions of a user that enable system 200 to authenticate the user and verify the user is a human and not a machine.

Interactions and interactives can refer to any type of input by the user of system 200, with or without a prompt, and which can include: sensor and/or device-based and acquired; single or multiple modalities such as visual, linguistic, audio, tactile, gaze-based; can be obtained by active and/or passive acquisition means; and/or which can be used to provide identity authenticators. The authentication modes according to current convention can include: behavioral and physiological information/data obtained as validating biometrics factors, which can refer to a "you/behavioral" attribute item, such as how the user holds a device, gait, swiping patterns, iris scans, facial recognition, fingerprints, DNA typing, ear prints, palm vein, pattern voice, signature and/or the like; knowledge-based factors, referring to a "know" item response such as username/password, answers to security questions and/or the like; and/or, device-based factors, for example, a "have" item, such as a bank card, phone, computer, e-wallet, thumb drive, and/or the like.

For human authentication purposes, these types of data can be viewed as human identity factors which are developed by combining two or more factors across multiple factors and/or less so within a single type of factor category as part of a Two-Factor ("2FA") or Multi-Factor Authentication ("MFA") protocol. To varying degrees, and depending on user activities, authentication factors can be subject to exploitation and/or outright theft through a variety of means and which can include: shoulder surfing, keystroke logging, signal/data intercept, phishing, device-theft, social intelligence and data mining, among others and is particularly applicable to co-opting of "knowledge" factors where poor user password hygiene can result in re-use of username and passwords across multiple applications. Passphrases offer the user a measure of enhanced security as such phrases are more difficult to game, but still can challenge users in their ability to remember multiple passphrases.

Computerized device 202 can include a display 215 configured to display a user recognition interface to facilitate a user generating a user registration and to allow the user continuous access to authority requiring information and/or systems.

System 100 includes an image database 220 configured to store images for generating a collection of images which system 200 can present to the user to select two or more images from which to generate a composite image, and where a second image can also be a solid color, including white. Image database 220 stores the composite image that is generated according to user-selected images. Image database 220 can be located within computerized device 102 and/or on a third-party computerized device 230. Third-party computerized device 130 can be, a server, a smartphone, a tablet, a computer, or the like.

Computerized device 202 can include a communication interface 225, which can be a transceiver configured to communicate with third-party computerized device 230, for example, through a network 240. In certain embodiments, network 240 includes wireless communication.

For example, where the user is accessing secured information provided through third-party computerized device 230, computerized device 202 is operative to provide the user access to third-party computerized device 230, authenticate the user and access the secured information.

System 200 can include one or more processors, referred generally as 205. A processor 205 can be operative at computerized device 102 and/or at third party-computerized device 230 to provide the user authentication through user interactions described herein. Processor 205 is configured to generate the composite image from the one or more images selected by the user and to generate a user profile to facilitate user validation. In certain embodiments, processor 205 can be configured to obtain the at least two images. The at least two images can be selected according to a user selection of the images or according to predetermined parameters provided to system 200.

Processor 205 can be configured to execute the method described herein in FIG. 3 for generating a user profile to facilitate user authentication and to execute the methods disclosed herein in FIG. 6 of authenticating a user according to the user interactions. Processor 205 can obtain the at least two images from the image database 220 and/or from the third-party computerized device 230 for generating the composite image. Each image of the at least two images can be obtained through data stored with each image which provides contiguity characteristics' data that can be used to determine the arrangement of the at least two images in the composite image. The selection of images and arrangement of sections in the composite image can result in stable and/or multi-stable/bi-stable configurations, percept switching, and the perception of depth resulting from the arrangement of the sections and the contiguity characteristics presented in the sections, e.g. the contiguity characteristics of the at least two images used for creating the composited image set. System 200 includes a user identity database 255 to store the information associated with the user identity to facilitate system 200 in authenticating the user identity.

Reference is now made to FIGS. 8A-8G showing a user identity generating interface 800 and 801, according to certain embodiments. User identity generating interface 800 and 801 differ in the presentation of the image selection gallery (802) in 800 FIGS. 8A-8B, but which is not shown in 801 (FIGS. 8C-8G). User identity generating interface 800 presents the user with an interactive interface that facilitates generating a user identity. User identity generating interface 800 is presented to the user through display 215 (FIG. 2). Interface 800 can have an image selection 802, an interaction window 804, an accept settings button 808 and/or the like thereby enabling the user to select the images for generating a composite image 101 (FIG. 1). Interface 800 can include a cancel button 805 to enable canceling the user identity generation and a caption image window 812 actuated by a caption image set button 810. The caption image window is operative to enable the user to input a descriptive text to the composite image 101 to provide additional security protocols during the user authentication. Interface 801 can include a keywords window 814 showing a designation of keywords from the descriptive text, and a security statement 815 the user may be required to complete to authenticate the user identity. Keywords and the security statement are used to generate knowledge-type authentication factors based on the user's image selections. Interface 801 can provide a checkmark 819 after completed steps of generating the user identity. The interface 801 displays a generated composite image 820 to the user as well as showing the images the user selected (816 and 818), composite sectioning options 824 and metadata selection tool 830. Interface provides a selection tool shape option 831 and a number of shapes 833 and an accept changes button 835 to accept the user options. The shapes, such as a circle or circular shape (oval) 837 or square/rectangle 839 can be presented to allow the user to drag the shape to a section of the generated composite image 820, thereby creating a user-defined, image-linked security key according to a placement of the shape on composite image 820. For example, a rhomboid shape (rectangle) placed as referenced by number 843 and circle placed as referenced by number 841. In certain embodiments, shapes can be arranged on a section of the images that facilitate generating the composite image set, such as a square 839 placed on image 816 and circle 837 placed on image 818, and/or on images without necessarily generating a composite image set as part of the user identity generating method. The metadata extraction method is also illustrated using different sized and shaped selection tools in FIGS. 5A-5B as described previously and below.

Reference is made now to FIG. 3 schematically illustrates a method executed by processor 205 (FIG. 2) for generating a user identity and authentication protocol through generating a composite image, according to certain embodiments. Step 300 discloses presenting a user with a user identity generating interface 800. User identity generating interface 800 (FIG. 8) can be displayed on display 215 (FIG. 2) thereby facilitating the user to view the user identity generating interface.

Step 301 discloses receiving user information. Processor 205 receives user information from input 210 (FIG. 2), for example in the form of typed information. The user information can include a username, date of birth, address, legal name, and/or the like to facilitate identifying the user according to knowledge-type factors.

Step 302 discloses obtaining images. Processor 205 obtains images, such as images 101, 102, 103 (FIG. 1) along with other images from image database 220 (FIG. 2) and/or from third-entity image database 235 (FIG. 2). In certain embodiments, images can be obtained by user providing the images to processor 205, for example by uploading the images or inputting images from a camera operative as input device 210.

Step 304 discloses presenting images to the user. The images obtained by processor 205 are provided to the user, for example, presenting the images to the user by displaying them through the user identity generating interface 800 via display 215.

Step 306 discloses receiving user images selection. Processor 205 receives as an input the user images selection provided through input 210.

Optional step 308 discloses verifying the user image selection.

Step 310 discloses generating a composite image according to the user image selection, which can include Steps 311, 313, 315.

Step 311 discloses defining a sectioning strategy. Processor 205 determines the sectioning strategy, which determines the number of slices each selected image is sectioned into for generating the composite image. The sectioning can be within a range of slice sizes, for example, each slice the size within a range of 0.5% to 50% of the selected image.

Step 313 discloses serially sectioning the user selected images. Processor 205 arranges the sliced portions of the images and arranges the slices in a predetermined arrangement to generate the composite image to provide the desired features of the composite image.

Step 315 discloses juxtaposing the image sections. Processor 205 juxtaposes the image sections in the predetermined order. The composite image is then generated by processor 205.

Step 312 discloses selecting metadata from the composite image. Processor 205 obtains metadata from the composite image and selects metadata for generating a password. The selection can be by a predetermined algorithm that selects objects, contiguities, sections, and/or the like in the image and their associated metadata, such as letters, numbers, characters, and/or the like.

Step 314 discloses generating a composite image-based password. Processor 205 generates a password from the selected metadata, for example as an alphanumeric sequence.

Optional step 316 discloses verifying the composite image password.

Step 318 discloses storing the user identity. Processor 205 stores the user identity in a storage database 250 (FIG. 2). The user identity stored includes the username, the alphanumeric password provided by the user, an image identifier enabling processor 205 to obtain the image and/or composite image from image database 220 and/or third-entity image database 235, the alphanumeric password generated according to the metadata, and/or the like.

FIG. 4 schematically illustrates a method performed by processor 205 (FIG. 2) for generating a user authentication according to generating of the composite image and utilizing image-based metadata to derive an alphanumeric password, according to certain embodiments.

Step 410 discloses presenting the user with a composite image to the user. Composite image 100 (FIG. 1) is presented to the user, for example, through identity generating interface 800 (FIG. 8A), which is presented to the user via display 215 (FIG. 2). It is appreciated by one skilled in the art that composite image 100 can be interchangeable with image 101, 102, 103 (FIG. 1) where the user chooses to use a non-composite image for authentication.

Step 420 discloses providing the user with an element marker tool 837 (FIG. 8F), also referred to as a selection tool. The element marker tool enables the user to mark objects and/or draw shapes on the composite image. The element marker tool can be operated by input 205.

Step 422 discloses receiving one or more user marked composite image elements. Processor 205 receives inputs of the markings provided by the user via input 205, thereby selecting or highlighting objects in the composite image and/or sections in the composite image according to certain embodiments. The user can also use the element marker tool to select and/or highlight objects in component images 845, 847 (FIG. 8G).

Step 424 discloses generating private key from the one or more user marked composite image elements. Processor 205 designates the metadata corresponding to the marked elements in the composite image from which to generate an alphanumeric sequence as a password.

Step 425 discloses processor 205 applying a hash function to the one or more user marked composite image elements.

Step 427 discloses processor 205 deriving a salt value from the metadata of the composite image after application of the hash function.

Step 429 discloses storing the salt value, for example, with the user information in user identity database 250.

Step 430 discloses storing an encrypted element and sending the encrypted element to computerized device 201 (FIG. 2). In certain embodiments, separate sections of the alphanumeric password can be stored on separate devices, thereby having keys on separate devices to provide an additional authentication, by requiring all parts of the key to authenticate the user identity.

Step 435 discloses processor 205 storing a hashed value, for example, with the user information in user identity database 250.

Step 440 discloses processor 205 storing the user identity data with the necessary authentication interactions.

FIGS. 5A-5B schematically illustrate extraction of metadata from the composite image thereby generating a user authentication of the user identity, according to certain embodiments. A composite image 510 is marked, for example with markers 522, 524, 526, 528 highlighting different portions of composite image 510. In certain embodiments, markings can have different geometric shapes, such as a triangle marking 534, a circle marking 532, square markings 530, 536 and/or the like, and which can be re-sized symmetrically and/or asymmetrically. For example, asymmetric distortion can transform a square into a rectangle, or an equilateral triangle into a right triangle, according to user preferences. Shapes can be extracted and used to form an identifying combination, referenced generally as 540 and 545. The shapes correspond to metadata 565 that is used to generate the sections marked by at least one of the shapes in the composite image, which corresponds to composite image metadata 560. The metadata 565 is used as the basis for generating the password.

Reference is made to FIG. 9 showing a user authentication interface 900, according to certain embodiments. Authentication interface 900 facilitates enabling the user to authenticate the identity of the user and verifying the human status of the user by completing predetermined interaction requirements. In certain embodiments, the interactions include identifying the user identifying previously selected images from a collection of image sections and/or to place an image section on a corresponding collection of two or more composite images, selecting from the group the composite image set or component images which the user previously selected and registered. In certain embodiments, where no images have been pre-registered, the user might be tasked with extracting a section and matching it to a presented composite or individual image in a puzzle-type interaction. The interaction task is designed to confound non-human threat actors in extracting the appropriately matched image section whether these are pre-registered or presented as part of an "are you human" verification as a completely automated public Turing test to tell computers and humans apart ("CAPTCHA") verification.

The pre-registered image sets in this format of "parts of the whole" can also be used for re-logins after timed-out sessions or idle computer time to provide users with an easy-to-use embedded tool to regain access to their computers, network, application and/or other devices without the need for a token-type verification method.

Authentication interface 900 includes a username input box 910, a text password box 920 and image selection 922, and/or the like. In certain cases, a checkmark, generally referenced as 928, can show a correct input by the user, or a correct selection of images, referenced generally as 926. In certain embodiments, a composite image 930 is presented in authentication interface 900 and a selection option 932 is provided to the user to identify and/or match sections of the composite image, shown generally as reference arrows 933, 935. Another authentication can include typing one or more keywords into a keyword text box 937 and with the text input 938. When authentication is verified, one or more checkmarks can be displayed, referenced generally as 928, 929. In one embodiment input is via text, but can also be accomplished by voice inputs which provide both the knowledge-based factors as well as an additional biometrics-based authentication factor.

Referring to FIGS. 9M and 9N, in certain embodiments, the user interaction includes using cursive text completion tasks which are based on the user's vectored (directional) movements, referenced generally as 951, across incomplete or outlined text 950 which is to be completed by the user to generate a coherent flow to the word, referenced generally as 952. The interaction can be viewed as being similar to a "connect-the-dots" interaction but with cursive text and angle indicators to show direction. The user can select from a movement selection box 956 displaying movement options, referenced generally as 957 958, 959, which the user can arrange in an order to complete the text, by placing the movements in the relevant boxes, referenced generally as 960, 961, 962 by dragging and/or clicking the movements along reference lines 967, 968, 969 to the correct.

Referring back to FIG. 6 schematically illustrates a method for authenticating the user identity, according to a certain embodiments. Step 610 discloses providing the user with an authentication interface. Processor 205 (FIG. 2) provides the authentication showing a display of authentication interface 900 (FIG. 9A), for example, via display 215

(FIG. 2). Authentication interface 900 includes interactive elements through which the user provides user identification and authentication information, for example, fill in boxes in which the user types in username but where the alphanumeric password created by the user when generating the user identity is completed by the system. The user inputs the user identification and authentication information, for example via input 210 (FIG. 2).

Step 612 discloses receiving the user identification data. Processor 205 receives the user identification data from input 210.

Step 614 discloses providing the user with an authentication interaction interface. Processor 205 provides the authentication interaction interface to display 215 thereby presenting the user with the composite image with which the user interacts to authenticate the user identity. The authentication interface can include one or more authentication interactions (616), such as a graphic-based interaction (Step 617), image-based interaction (Step 618), lexicon and/or verbal interaction (Step 619), and/or the like associated with the user's pre-registered images.

Step 620 discloses receiving a user interactive input. Processor 205 receives from input 205 the user interactive input, which can include a predetermined interaction of the user with the composite image. The user interactive input can include rearranging the composite image into the separate image or images that are used to display the composite images, match sections, identify parts of the image and/or image set, mark sections of the composite image, mark predetermined shapes in predetermined portions of the composite image thereby matching sections of the image, answer questions associated with the composite image, and/or the like.

Step 622 discloses analyzing user authentication input. Processor 205 analyzes the user authentication input to obtain the metadata associated with the user interaction with the composite image.

Step 624 discloses determining whether the user authentication input matches the stored authentication. Processor 205 compares the use authentication input with the authentication data to determine whether they match.

Step 640 discloses user authentication fails because there is no match between the user interactions input and the user interactions presented to the user. Processor 205 determines user interactions input and the user interactions presented to the user do not match.

Step 642 discloses counting number of authentication attempts. Processor 205 counts the number of attempts a user makes to authenticate to determine if a predetermined number of attempts have been provided.

Step 644 discloses determining whether number of attempts is less than a predetermined value. Processor 205 compares the number of attempts to the predetermined number of attempts to see if the numbers are equal or if the number of attempts is less than the predetermined number of attempts.

Step 646 discloses determining number of attempts is equal to the predetermined value. Processor 205 determines the number of attempts is equal to the predetermined number of attempts. Where the number of authentication attempts is less than the predetermined number of attempts, the user is provided with another attempt to authenticate the user identity, as disclosed by Step 614.

Step 648 discloses denying the user access. Processor 205 denies the user access after the number of attempts is equal to the number of predetermined number of attempts.

Step 650 discloses generating a flag of the access attempt. Processor 205 generates a flag to notify the authority of the restricted information that a user has failed to authenticate the user identity for the predetermined number of times and which may represent an attempted intrusion and/or unauthorized access by an authorized user to a restricted area of the system and/or attempt at unauthorized access by an unauthorized user.

Step 628 discloses verifying the user identification. Where processor 205 matches the user authentication input with the stored authentication data, processor verifies the user identification.

Step 630 discloses providing the user with access to protected information. Processor grants the user with access to the restricted information.

FIGS. 7A-7B illustrate composite image interactions enabling the authentication of the user identity, according to certain embodiments. Composite image 700 interactions can include interacting with sections, such as sections 710, 720 that are sections of images 715, 725 respectively. Sections 710, 720 can be used to match to, reconstruct or identify the two-image composite image 510. In certain embodiments, three image composite images 740, 745 which include sections from three images 746, 747, 748, can be used to generate different combinations of two-image composite images 750, 755, 760, 765, and to identify differences or missing elements in comparing 750 to 760, and/or 755 to 765, where the contiguities have been selectively removed in 760 and 765 from component image 746.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly including additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally including or linked with a processor or other circuitry.

The term computerized apparatus or a computerized system or a similar term denotes an apparatus comprising one or more processors operable or operating according to one or more programs. As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function (s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

As used herein the term "configuring" and/or 'adapting' for an objective, or a variation thereof, implies using materials and/or components in a manner designed for and/or implemented and/or operable or operative to achieve the objective.

Unless otherwise specified, the terms 'about' or 'close' imply at or in a region of, or close to a location or a part of an object relative to other parts or regions of the object.

When a range of values is recited, it is merely for convenience or brevity and includes all the possible sub-ranges as well as individual numerical values within and about the boundary of that range. Any numeric value, unless otherwise specified, includes also practical close values enabling an embodiment or a method, and integral values do not exclude fractional values. A sub-range values and practical close values should be considered as specifically disclosed values.

As used herein, ellipsis ( . . . ) between two entities or values denotes an inclusive range of entities or values, respectively. For example, A . . . Z implies all the letters from A to Z, inclusively.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

Terms in the claims that follow should be interpreted, without limiting, as characterized or described in the specification.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for authenticating a user identity according to predetermined user interactions, comprising using at least one hardware processor for:

obtaining a composite image from a database, said composite image generated by rearranging at least two images to establish an image having a figure-ground dynamic wherein said at least two images are sectioned into predetermined number of sliced portions that are arranged such that a first image establishes a figure position and a second image establishes a background position;

presenting said composite image to a user through an authentication interface;

requesting from the user at least one user interaction related to said composite image;

obtaining an input comprising at least one user interaction input;

comparing said at least one user interaction input with said at least one user interaction to validate the user identity and to validate the user is a human;

providing an indication regarding the user identity according to a result of comparing said at least one user interaction input with said at least one user interaction.

2. A method according to claim 1, wherein the indication is that said at least one user interaction input does not match said at least one user interaction and further comprising using the at least one hardware processor for:

counting a number of user attempts to validate said user identity;

comparing the number of user attempts to a predetermined attempts number;

generating a flag where the number of user attempts matches the predetermined number of attempts, providing said flag to a regulating entity to deny the user access.

3. A method according to claim 1, wherein the indication is that said at least one user interaction input matches said at least one user interaction and further comprising using the at least one hardware processor for:

authenticating the user identity and the user status as a human;

allowing the user access.

4. A method according to claim 1, further comprising using the at least one hardware processor for:

providing a sequence of interactions as a second authentication process;
obtaining user inputs responsive to the sequence of interactions displayed;
comparing the user inputs with said sequence of interactions;
providing an indication regarding the user identity according to a result of comparing the user inputs and said sequence of interactions.

5. A method according to claim 1, further comprising using the at least one hardware processor for:
providing an identity generating interface enabling a user to select a username;
receiving from the user via an input comprising said at least two images;
receiving from the user at least one user interaction that is associated with said composite image that enables the user to authenticate the user identity; and,
storing the composite image and the at least one user interaction with the user identity.

6. A method according to claim 5, further comprising using the at least one hardware processor for extracting a subset of metadata from said at least one image to generate an alphanumeric password operative to authenticate the user identity.

7. A method according to claim 6, further comprising using the at least one hardware processor for:
providing the user with a marking tool configured to mark portions of said at least one image,
receiving at least one marking performed by the user that indicate a sequence of interactions with the at least one image, wherein said sequence of interactions provides at least one user marked composite image element to facilitate the user authentication;
generating at least one key associated with at least one marked composite image element;
providing separate sections of said alphanumeric password to separate devices; and,
requiring all parts of the keys to authenticate the user identity.

8. A method according to claim 1, wherein said at least one image is a composite image generated from at least two or more images.

9. A method according to claim 8, wherein said composite image requires a user to virtually reassemble spatially separated image parts of said composite image by virtually reconstructing an intact image of one of the at least two images.

10. A method according to claim 8, wherein said user interaction enables detecting a non-human threat by requiring the user to match image sections of the composite image.

11. A computer program product to facilitate authenticating a user identity, the computer program product comprising a non-transitory computer-readable storage medium having program code embodied therewith, the program code executable by at least one hardware processor to:
obtain a composite image from a database, said composite image generated by rearranging at least two images to establish an image having a figure-ground dynamic wherein said at least two images are sectioned into predetermined number of sliced portions that are arranged such that a first image establishes a figure position and a second image establishes a background position;
present said composite image to a user through an authentication interface;
request from the user at least one user interaction related to said composite image;
obtain an input comprising an at least one user interaction input;
compare said at least one user interaction input with said at least one user interaction to validate the user identity and to validate the user is a human;
providing an indication regarding the user identity according to a result of comparing said at least one user interaction input with said at least one user interaction.

12. A computer program product according to claim 11, further comprising program code executable by at least one hardware processor to:
provide an identity generating interface enabling a user to select a username;
receive from the user via an input comprising said at least two images;
receive from the user at least one user interaction that is associated with said composite image that enables the user to authenticate the user identity; and,
store the composite image and the at least one user interaction with the user identity.

13. A computer program product according to claim 11, wherein the indication is that said at least one user interaction input does not match said at least one user interaction and further comprising program code executable by at least one hardware processor to:
count a number of user attempts to validate said user identity;
compare the number of user attempts to a predetermined attempts number;
generate a flag where the number of user attempts matches the predetermined number of attempts,
provide said flag to a regulating entity to deny the user access.

14. A computer program product according to claim 11, wherein the indication is that said at least one user interaction input matches said at least one user interaction and further comprising program code executable by at least one hardware processor to:
authenticating the user identity and the user status as a human;
allowing the user access.

15. A computer program product according to claim 11, further comprising program code executable by at least one hardware processor to extract a subset of metadata from said at least one image to generate an alphanumeric password operative to authenticate the user identity.

16. A computer program product according to claim 15, further comprising program code executable by at least one hardware processor to:
provide a sequence of interactions as a second authentication process;
obtain user inputs responsive to the sequence of interactions displayed;
compare the user inputs with said sequence of interactions;
provide at least one user marked composite image element to facilitate an indication regarding the user identity according to a result of comparing the user inputs and said sequence of interactions
generating at least one key associated with at least one marked composite image element;
providing separate sections of said alphanumeric password to separate devices; and,
requiring all parts of the keys to authenticate the user identity.

17. A system configured to authenticate a user identity according to predetermined user interactions, comprising:
at least one hardware processor configured to:
obtaining a composite image from a database, said composite image generated by rearranging at least two images to establish an image having a figure-ground dynamic wherein said at least two images are sectioned into predetermined number of sliced portions that are arranged such that a first image establishes a figure position and a second image establishes a background position;
present said composite image to a user through an authentication interface;
request from the user at least one user interaction related to said composite image;
obtain an input comprising an at least one user interaction input;
compare said at least one user interaction input with said at least one user interaction to validate the user identity and to validate the user is a human;
providing an indication regarding the user identity according to a result of comparing said at least one user interaction input with said at least one user interaction;
a display configured to present the user with said authentication interface and with an indication as to a verification of the user identity;
an input configured to obtain the input and provide the input to the at least one processor.

18. The system of claim 17, wherein
the at least one processor is further configured:
to extract a subset of metadata from said at least one image to generate an alphanumeric password operative to authenticate the user identity,
said at least one image is a composite image generated from at least two or more images, said composite image requires a user to users virtually reassemble the spatially separated image parts of said composite image by virtually reconstructing an intact image of one of the at least two images image;
providing the user with a marking tool configured to mark portions of said at least one image,
receiving at least one marking performed by the user that indicate a sequence of interactions with the at least one image, wherein said sequence of interactions provides at least one user marked composite image element to facilitate the user authentication;
generating at least one key associated with at least one marked composite image element;
providing separate sections of said alphanumeric password to separate devices; and,
requiring all parts of the keys to authenticate the user identity.

19. A system according to claim 17, further comprising a user identity database configured to the user at least one user interaction that is associated with said at least one image, wherein said at least one user interaction is associated with said at least one image when the user creates the user identity.

20. A system according to claim 19, wherein the at least one processor is further configured to:
provide an identity generating interface enabling a user to select a username;
receive from the user via an input comprising said at least two images;
receive from the user at least one user interaction that is associated with said composite image that enables the user to authenticate the user identity; and,
store at said user identity database the composite image and the at least one user interaction with the user identity;
wherein said identity generating interface is displayed to the user via the display.

* * * * *